United States Patent
Onagi et al.

(10) Patent No.: US 9,754,726 B2
(45) Date of Patent: Sep. 5, 2017

(54) NONAQUEOUS ELECTROLYTIC CAPACITOR ELEMENT

(71) Applicants: Nobuaki Onagi, Kanagawa (JP);
Okitoshi Kimura, Kanagawa (JP);
Eiko Hibino, Kanagawa (JP);
Hisamitsu Kamezaki, Kanagawa (JP);
Tatsumi Ishihara, Fukuoka (JP)

(72) Inventors: Nobuaki Onagi, Kanagawa (JP);
Okitoshi Kimura, Kanagawa (JP);
Eiko Hibino, Kanagawa (JP);
Hisamitsu Kamezaki, Kanagawa (JP);
Tatsumi Ishihara, Fukuoka (JP)

(73) Assignees: Ricoh Company, Ltd., Tokyo (JP);
Kyushu University, Fukuoka-shi (JP)

( * ) Notice: Subject to any disclaimer, the term of this patent is extended or adjusted under 35 U.S.C. 154(b) by 0 days.

(21) Appl. No.: 14/441,749

(22) PCT Filed: Nov. 11, 2013

(86) PCT No.: PCT/JP2013/080967
§ 371 (c)(1),
(2) Date: May 8, 2015

(87) PCT Pub. No.: WO2014/073712
PCT Pub. Date: May 15, 2014

(65) Prior Publication Data
US 2015/0287537 A1 Oct. 8, 2015

(30) Foreign Application Priority Data
Nov. 12, 2012 (JP) ................................ 2012-248563
Sep. 20, 2013 (JP) ................................ 2013-195117

(51) Int. Cl.
*H01M 10/0567* (2010.01)
*H01G 9/035* (2006.01)
(Continued)

(52) U.S. Cl.
CPC ............... *H01G 9/035* (2013.01); *H01G 9/04* (2013.01); *H01G 9/145* (2013.01); *H01G 11/62* (2013.01);
(Continued)

(58) Field of Classification Search
CPC ................................................. H01M 10/0567
See application file for complete search history.

(56) References Cited

U.S. PATENT DOCUMENTS

| 5,437,943 A | 8/1995 | Fujii et al. |
| 5,489,492 A | 2/1996 | Asami et al. |

(Continued)

FOREIGN PATENT DOCUMENTS

| CN | 101662030 | * 3/2010 |
| JP | 3368918 | 11/2002 |

(Continued)

OTHER PUBLICATIONS

JP 2005-251472 MT.*
(Continued)

*Primary Examiner* — Alex Usyatinsky
(74) *Attorney, Agent, or Firm* — Oblon, McClelland, Maier & Neustadt, L.L.P.

(57) ABSTRACT

To provide a nonaqueous electrolytic capacitor element, which contains: a positive electrode containing a positive electrode active material capable of intercalating or deintercalating anions; a negative electrode containing a negative electrode active material; and a nonaqueous electrolyte, which contains a nonaqueous solvent, an electrolyte salt containing a halogen atom, and a compound having a site capable of bonding to an anion containing a halogen atom.

5 Claims, 12 Drawing Sheets

(51) Int. Cl.

| | | |
|---|---|---|
| *H01G 11/62* | (2013.01) | |
| *H01G 11/64* | (2013.01) | |
| *H01M 10/052* | (2010.01) | |
| *H01M 10/0568* | (2010.01) | |
| *H01M 10/0569* | (2010.01) | |
| *H01G 9/04* | (2006.01) | |
| *H01G 9/145* | (2006.01) | |
| *H01M 4/583* | (2010.01) | |
| *H01M 10/0525* | (2010.01) | |

(52) U.S. Cl.
CPC .......... *H01G 11/64* (2013.01); *H01M 4/583* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2220/20* (2013.01); *H01M 2220/30* (2013.01); *H01M 2300/0028* (2013.01); *Y02E 60/13* (2013.01)

(56) References Cited

U.S. PATENT DOCUMENTS

| | | | |
|---|---|---|---|
| 7,588,859 | B1 * | 9/2009 | Oh .................. H01B 1/122 252/62.2 |
| 2004/0131940 | A1 | 7/2004 | Suzuki et al. |
| 2006/0210883 | A1 | 9/2006 | Chen et al. |
| 2006/0269834 | A1 * | 11/2006 | West .................. H01M 4/133 429/105 |
| 2006/0292447 | A1 | 12/2006 | Suzuki et al. |
| 2007/0065728 | A1 * | 3/2007 | Zhang .................. H01M 4/134 429/326 |
| 2007/0072085 | A1 | 3/2007 | Chen et al. |
| 2007/0148548 | A1 | 6/2007 | Suzuki et al. |
| 2012/0028132 | A1 | 2/2012 | Tsujioka et al. |
| 2012/0141875 | A1 | 6/2012 | Watanabe |
| 2013/0288113 | A1 | 10/2013 | Onagi et al. |
| 2014/0186696 | A1 | 7/2014 | Onagi et al. |

FOREIGN PATENT DOCUMENTS

| | | | |
|---|---|---|---|
| JP | 2004-134295 | | 4/2004 |
| JP | 2004-134658 | | 4/2004 |
| JP | 2005-251472 | | 9/2005 |
| JP | 2006019070 | * | 1/2006 |
| JP | 2006-351306 | | 12/2006 |
| JP | 2007-207483 | | 8/2007 |
| JP | 2007-305522 | | 11/2007 |
| JP | 2008-084772 | | 4/2008 |
| JP | 2008-117623 | | 5/2008 |
| JP | 2008-123798 | | 5/2008 |
| JP | 2008-159315 | | 7/2008 |
| JP | 2008-159316 | | 7/2008 |
| JP | 2008-198499 | | 8/2008 |
| JP | 2008-198542 | | 8/2008 |
| JP | 2008-543002 A | | 11/2008 |
| JP | 2009-088131 | | 4/2009 |
| JP | 4314087 | | 5/2009 |
| JP | 2009-187753 | | 8/2009 |
| JP | 4392169 | | 10/2009 |
| JP | 4516845 | | 5/2010 |
| JP | 2010-135190 | | 6/2010 |
| JP | 2010-257616 | | 11/2010 |
| JP | 2010-263058 | | 11/2010 |
| JP | 2011-034675 | | 2/2011 |
| JP | 2011-096672 | | 5/2011 |
| JP | 2011-204691 | | 10/2011 |
| JP | 4928828 | | 2/2012 |
| JP | 4948109 | | 3/2012 |
| JP | 5002188 | | 5/2012 |
| JP | 2013-243127 | | 12/2013 |
| WO | WO 2006/003858 A1 | | 1/2006 |
| WO | WO 2006/128174 A2 | | 11/2006 |

OTHER PUBLICATIONS

Chen et al. Electrochimica Acta 53 (2008) 3267-3270.*
JP 2006019070MT.*
CN101662030 MT.*
U.S. Appl. No. 14/648,989, filed Jun. 2, 2015 Inventor: Kimura, et al.
U.S. Appl. No. 14/649,434, filed Jun. 3, 2015 Inventor: Hirowatari, et al.
Extended European Search Report issued on Oct. 23, 2015 in Patent Application No. 13853054.8.
Dahn, et al., "Energy and Capacity Projections for Practical Dual-Graphite Cells", Journal of the Electrochemical Society, vol. 147, No. 3, (2000), pp. 899-901.
Chen, et al., "Impact of tripropyl borate on life and impedance of lithium-ion cells", Electrochimica Acta, vol. 53, (2008), pp. 3267-3270.
Chen, et al., "Tris(pentafluorophenyl) Borane as an Additive to Improve the Power Capabilities of Lithium-Ion Batteries", Journal of the Electrochemical Society, vol. 153, No. 6, (2006), pp. A1221-A1225.
Sun, et al., "Using a Boron-Based Anion Receptor Additive to Improve the Thermal Stability of LiPF6-Based Electrolyte for Lithium Batteries", Electrochemical and Solid-State Letters, vol. 5, No. 11, (2002), pp. A248-A251.
International Search Report Issued Feb. 25, 2014 for counterpart International Patent Application No. PCT/JP2013/080967 filed Nov. 11, 2013.
Korean Office Action issued May 12, 2016 in Patent Application No. 10-2015-7013757 (with English translation).

* cited by examiner

Cross-section of positive electrode

Surface of positive electrode

NONAQUEOUS ELECTROLYTIC CAPACITOR ELEMENT

TECHNICAL FIELD

The present invention relates to a nonaqueous electrolytic capacitor element, such as a nonaqueous electrolyte secondary battery, and a nonaqueous electrolyte capacitor.

BACKGROUND ART

In recent years, accompanied by downsizing and enhanced performance of mobile devices, a non-aqueous electrolyte secondary battery has improved properties as a non-aqueous electrolyte storage element having high energy density and become widespread. Also, attempts are underway to improve gravimetric energy density of the non-aqueous electrolyte secondary cell, aiming to expand its application to electric vehicles.

Conventionally, a lithium ion secondary battery including a positive electrode of a lithium-cobalt composite oxide, a negative electrode of carbon, and a nonaqueous electrolyte obtained by dissolving lithium salt in a nonaqueous solvent has been widely used as the nonaqueous electrolyte secondary battery.

Meanwhile, there is a nonaqueous electrolyte secondary battery, which is charged and discharged by intercalation or deintercalation of anions in a nonaqueous electrolyte to a positive electrode of a material, such as an electroconductive polymer, and a carbonaceous material, and by intercalation or deintercalation of lithium ions in the nonaqueous electrolyte to a negative electrode of a carbonaceous material (this type of battery may be referred to as "dual carbon battery" hereinafter) (see PTL 1).

In this dual carbon battery, as indicated by the following reaction formula, the cell is charged by intercalation of anions such as $PF_6^-$ and so on from the non-aqueous electrolyte to the positive electrode and by intercalation of $Li^+$ from the non-aqueous electrolyte to the negative electrode, and the cell is discharged by deintercalation of anions such as $PF_6^-$ and so on from the positive electrode and deintercalation of $Li^+$ from the negative electrode to the non-aqueous electrolyte.

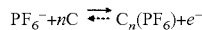 Positive electrode: $PF_6^- + nC \rightleftarrows C_n(PF_6) + e^-$

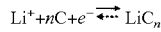 Negative electrode: $Li^+ + nC + e^- \rightleftarrows LiC_n$

⇄ charging reaction
discharge reaction

A discharge capacity of the dual carbon cell is determined by an anion storage capacity of the positive electrode, an amount of possible anion release of the positive electrode, a cation storage amount of the negative electrode, an amount of possible cation release of the negative electrode, and an amount of anions and amount of cations in the nonaqueous electrolyte. Accordingly, in order to improve the discharge capacity of the dual carbon battery, it is necessary to increase not only a positive electrode active material and a negative electrode active material, but also an amount of the non-aqueous electrolyte containing lithium salt (see NPL 1).

As described above, a quantity of electricity the dual carbon battery has is proportional to a total amount of anions and cations in a nonaqueous electrolyte. Accordingly, the energy stored in the battery is proportional to a total mass of the nonaqueous electrolyte in addition to a positive electrode active material and a negative electrode active material. Therefore, it is difficult to enhance the weight energy density of the battery. When a nonaqueous electrolyte having a lithium salt density of about 1 mol/L, which is typically used in a lithium ion secondary battery, is used, a large amount of the nonaqueous electrolyte is necessary compared to a case of a lithium ion secondary battery. When a nonaqueous electrolyte having a high lithium salt density, i.e., about 3 mol/L, on the other hand, there is a problem that a reduction in a battery capacity is large as charging and discharging of the battery are repeated.

The operating voltage of the dual carbon battery is in the range of about 2.5 V to about 5.4 V, and the maximum voltage thereof is higher than that of a lithium ion secondary battery (about 4.2 V) by about 1 V. Therefore, the nonaqueous electrolyte tends to be decomposed. Once the nonaqueous electrolyte is decomposed, generation of gas, or excessive formation of a film of fluoride on a surface of an electrode is caused, which leads to reduction in the battery capacity or deterioration of the battery. Therefore, it is necessary to provide a countermeasure for fluoride generated by decomposition of the nonaqueous electrolyte.

In a nonaqueous electrolyte secondary battery as a non-aqueous electrolytic capacitor element, moreover, a non-electroconductive film, so called a solid electrolyte interface (SEI) is formed at the time of an initial charging and discharging. The SEI prevents decomposition and deterioration of a negative electrode, which may be caused by a strong reduction reaction at the time of charging, and generation of gas due to decomposition of the nonaqueous electrolyte. As the electrolyte salt density is increased to increase the discharge capacity, however, a SEI is not desirably formed. Therefore, there is a problem that the charge capacity is lowered as a number of a cycle of charging and discharging is increased.

Moreover, disclosed is an example using a nonaqueous electrolyte containing a compound having a site capable of bonding to anions (see NPL 2 and NPL 3).

However, in these disclosed techniques, a positive electrode containing a positive electrode active material capable of intercalation and/or deintercalation of anions is not discussed. Moreover, NPL 2 discusses use thereof only to the charge voltage of about 3.8 V, and NPL 3 discusses use thereof only to the charge voltage of about 4.1 V, and both of them have not discussed use thereof at high voltage. Moreover, both literatures discuss use of the aforementioned nonaqueous electrolyte with the electrolyte concentration of about 1 M, not with a high concentration thereof.

CITATION LIST

Patent Literature

PTL1: Japanese Patent Application Laid-Open (JP-A) No. 2005-251472

Non-Patent Literature

NPL 1: Journal of The Electrochemical Society, 147(3) 899-901(2000)
NPL 2: Electrochimica Acta, vol. 53, No. 8, P3267 (2008)
NPL 3: Journal of the Electrochemical Society, vol. 153, No. 6, A1221 (2006)

SUMMARY OF INVENTION

Technical Problem

The present invention aims to provide a nonaqueous electrolytic capacitor element, which has improved durability for repetitive use, has high capacity (discharge capacity and charge capacity) and excellent output property, and has improved weight energy density.

Solution to Problem

As the means for solving the aforementioned problems, the nonaqueous electrolytic capacitor element of the present invention contains:
a positive electrode containing a positive electrode active material capable of intercalating or deintercalating anions,
a negative electrode containing a negative electrode active material, and
a nonaqueous electrolyte, which contains a nonaqueous solvent, an electrolyte salt containing a halogen atom, and a compound having a site capable of bonding to an anion containing a halogen atom.

Advantageous Effects of Invention

The present invention can solve the aforementioned various problems in the art and achieves the object, and can provide a nonaqueous electrolytic capacitor element, which has improved durability for repetitive use, has high capacity (discharge capacity and charge capacity) and excellent output property, and has improved weight energy density.

Figure 1:
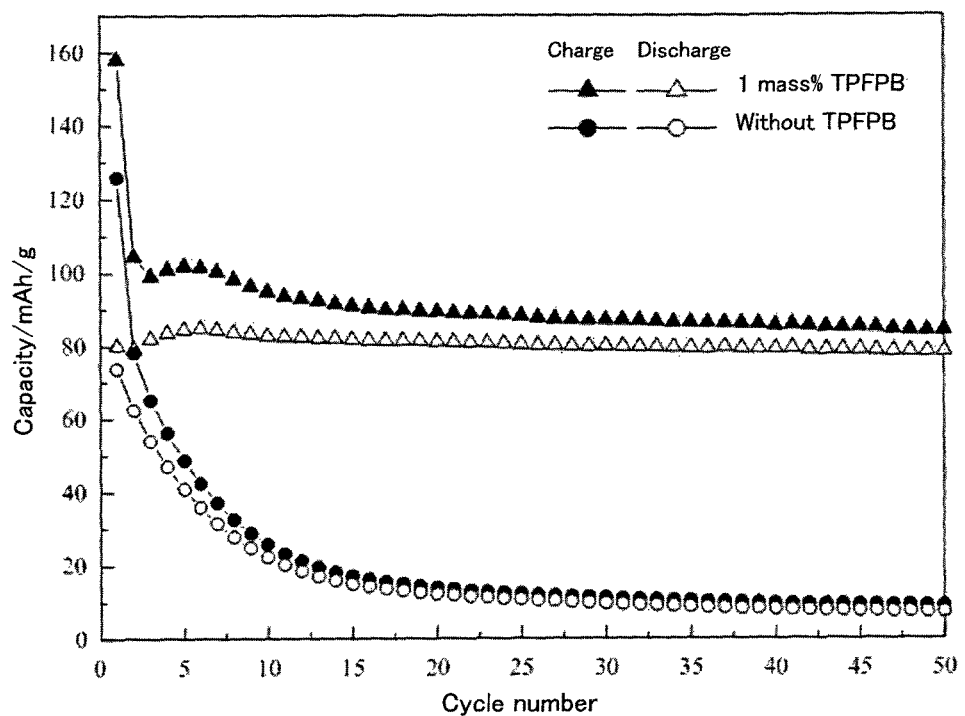
FIG. 1 depicts the results of the charging-discharging test using a nonaqueous electrolytic capacitor element, in which 1.0% by mass of tris(pentafluorophenyl)borane (TPFPB) is added to the dimethyl carbonate (DMC) electrolytic solution where 4 mol/L of $LiPF_6$ has been dissolved, and a nonaqueous electrolytic capacitor element to which no TPFPB has been added.

DESCRIPTION OF EMBODIMENTS (Nonaqueous Electrolytic Capacitor Element)

The nonaqueous electrolytic capacitor element of the present invention contains a positive electrode, a negative electrode, and a nonaqueous electrolyte, and may further contain other members, if necessary.

Examples of the nonaqueous electrolytic capacitor element include a nonaqueous electrolyte secondary battery, and a nonaqueous electrolyte capacitor.

The present inventors have diligently studied a mechanism of a phenomenon that a capacity of a dual carbon battery having a high electrolyte salt density of about 3 mol/L is reduced as the dual carbon battery is repetitively charged and discharged. As a result, they have found that it is influenced by anions having a halogen atom, such as fluorine, originated from decomposition of an electrolyte salt containing a halogen atom, such as fluorine.

Therefore, the present inventors have diligently conducted researches about a material that chemically traps an anion containing a halogen atom, such as fluorine, to avoid adverse affect to an electrode. As a result, they have found that, when a nonaqueous electrolyte having a high electrolyte salt density is used, reduction in a capacity of a battery, which becomes particularly significant due to repetitive charging and discharging, can be effectively prevented by using preferably tris(pentafluorophenyl)borane (TPFPB) or tris(hexafluoroisopropyl)borate (THFIPB) as a compound having a site capable of bonding to an anion containing a halogen atom.

Moreover, the nonaqueous electrolytic capacitor element can be operated with a nonaqueous electrolyte, an electrolyte salt density of which is about 1 mol/L. However, the maximum voltage thereof is high, i.e., about 5.4 V, and therefore the nonaqueous electrolyte may be decomposed. The decomposition of the nonaqueous electrolyte releases a halogen atom, such as fluorine, to thereby adversely affect the nonaqueous electrolytic capacitor element. However, the present inventors have found that the adverse affect of a halogen atom, such as fluorine, to the battery can be prevented by adding preferably TPFPB and THFIPB as a compound having a site capable of bonding to an anion containing a halogen atom.

Furthermore, the present inventors have diligently studied a mechanism of a phenomenon that, when an electrolyte salt density is increased to about 3 mol/L, or high voltage is performed on a nonaqueous electrolytic capacitor element using a type of electrodes where anions are stored in a positive electrode, a charge capacity thereof is reduced. As a result, they have found that, when LiPF$_6$ is used as an electrolyte salt, it is influenced by a fluorine component originated from decomposition of PF$_6^-$, which is an anion. Therefore, the present inventors have searched a material, which chemically traps an anion including fluorine to avoid adverse effect to the electrode. As a result, as described later, they have found a compound having a site capable of bonding to an anion containing a halogen atom, and have found that among such compounds, tris(pentafluorophenyl)borane (TPFPB) represented by the following structural formula and tris(hexafluoroisopropyl)borate (THFIPB) have excellent properties.

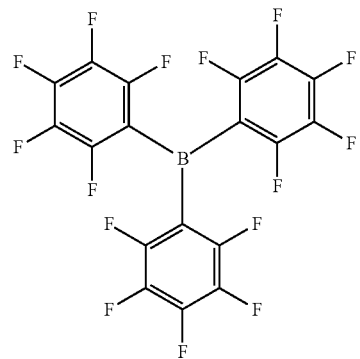 [SMILES: Fc1c(F)c(F)c(B(c2c(F)c(F)c(F)c(F)c2F)c2c(F)c(F)c(F)c(F)c2F)c(F)c1F]

Here, a nonaqueous electrolytic capacitor element, which contains a positive electrode using carbon powder (KS-6, manufactured by TIMCAL) as a positive electrode active material, a negative electrode using carbon powder (MAGD, manufactured by Hitachi Chemical Co., Ltd.) as a negative electrode active material, and a nonaqueous electrolyte, in which 1.0% by mass of tris(pentafluorophenyl)borane (TPFPB) is contained in dimethyl carbonate (DMC) to which 4 mol/L of LiPF$_6$ has been dissolved, is assembled. The nonaqueous electrolytic capacitor element is charged at room temperature (25° C.) to a charge terminal voltage of 5.2 V at a constant current of 0.5 mA/cm$^2$. After the first charging, the nonaqueous electrolytic capacitor element is discharged to 2.5 V at a constant current of 0.5 mA/cm$^2$. The test, in which this cycle of charging and discharging was repeated 50 times was performed. Note that, an Al foil is used as the positive electrode collector, and a Cu foil is used as the negative electrode collector.

FIG. 1 is a graph depicting the transition of the capacity (discharge capacity and charge capacity) of the nonaqueous electrolytic capacitor element of the aforementioned structure, in repetitive charging and discharging. It can be seen from the results of FIG. 1 that, when 1.0% by mass of tris(pentafluorophenyl)borane (TPFPB) is added as a compound having a site capable of bonding to an anion containing a halogen atom to dimethyl carbonate (DMC), in which 4 mol/L of $LiPF_6$ has been dissolved, deterioration of the capacity due to the repetitive charging and discharging can be prevented compared to the case where TPFPB is not added.

The present invention is associated with a reserve nonaqueous electrolytic capacitor element, which is operated in a system where a positive electrode intercalates and deintercalates anions, and which can prevent deterioration of an electrode by adding a compound having a site capable of bonding to an anion containing a halogen atom to a nonaqueous electrolyte, to thereby chemically bond to a fluorine component originated from anions used intercalation to a positive electrode.

Each constitutional member of the nonaqueous electrolytic capacitor element of the present invention is explained in detail hereinafter.

<Positive Electrode>

The positive electrode is appropriately selected depending on the intended purpose without any limitation, provided that the positive electrode contains a positive electrode active material. Examples thereof include a positive electrode containing a positive electrode material containing a positive electrode active material, provided on a positive electrode collector.

A shape of the positive electrode is appropriately selected depending on the intended purpose without any limitation, and examples thereof include a plate shape.

<<Positive Electrode Material>>

The positive electrode material is appropriately selected depending on the intended purpose without any limitation. For example, the positive electrode material contains at least a positive electrode active material, and may further contain an electroconductive agent, a binder, a thickener, etc. according to necessity.

—Positive Electrode Active Material—

The positive electrode active material is appropriately selected depending on the intended purpose without any limitation, provided that the positive electrode active material is a material capable of intercalation and/or deintercalation of anions, and examples thereof include a carbonaceous material, and an electroconductive polymer. Among them, a carbonaceous material is particularly preferable because of its high energy density.

Examples of the electroconductive polymer include polyaniline, polypyrrole, and polyparaphenylene.

Examples of the carbonaceous material include: blacklead (graphite), such as coke, artificial graphite, natural graphite; and a thermal decomposition product of an organic material under various thermal decomposition conditions. Among them, artificial graphite, and natural graphite are particularly preferable.

The carbonaceous material is preferably a carbonaceous material having high crystallinity. The crystallinity can be evaluated by X-ray diffraction, or Raman analysis. For example, in a powder X-ray diffraction pattern thereof using CuKα rays, the intensity ratio $I_{2\theta=22.3°}/I_{2\theta=26.4°}$ of the diffraction peak intensity $I_{2\theta=22.3°}$ at $2\theta=22.3°$ to the diffraction peak intensity $I_{2\theta=26.4°}$ at $2\theta=26.4°$ is preferably 0.4 or less.

A BET specific surface area of the carbonaceous material as measured by nitrogen adsorption is preferably 1 $m^2/g$ to 100 $m^2/g$. The average particle diameter (median diameter) of the carbonaceous material as measured by a laser diffraction-scattering method is preferably 0.1 μm to 100 μm.

—Binder—

The binder is appropriately selected depending on the intended purpose without any limitation, provided that the binder is a material stable to a solvent or electrolytic solution used during the production of an electrode. Examples of the binder include: a fluorine-based binder, such as polyvinylidene fluoride (PVDF), and polytetrafluoroethylene (PTFE); styrene-butadiene rubber (SBR); and isoprene rubber. These may be used alone, or in combination.

—Thickener—

Examples of the thickener include carboxy methyl cellulose (CMC), methyl cellulose, hydroxymethyl cellulose, ethyl cellulose, polyvinyl alcohol, oxidized starch, starch phosphate, and casein. These may be used alone, or in combination.

—Electroconductive Agent—

Examples of the electroconductive agent include: a metal material, such as copper, and aluminum; and a carbonaceous material, such as carbon black, and acetylene black. These may be used alone, or in combination.

<<Positive Electrode Collector>>

A material, shape, size, and structure of the positive electrode collector are appropriately selected depending on the intended purpose without any limitation.

The material of the positive electrode collector is appropriately selected depending on the intended purpose without any limitation, provided that it is composed of an electroconductive material. Examples thereof include stainless steel, nickel, aluminum, copper, titanium, and tantalum. Among them, stainless steel and aluminum are particularly preferable.

The shape of the positive electrode collector is appropriately selected depending on the intended purpose without any limitation.

The size of the positive electrode collector is appropriately selected depending on the intended purpose without any limitation, provided that it is a size appropriately used as an nonaqueous electrolytic capacitor element.

—Preparation Method of Positive Electrode—

The positive electrode can be produced by applying a positive electrode material, which has been formed into a slurry by appropriately adding the binder, the thickener, and the electroconductive agent, and a solvent to the positive electrode active material, onto the positive electrode collector, followed by drying. The solvent is appropriately selected depending on the intended purpose without any limitation, and examples thereof include an aqueous solvent, and an organic solvent. Examples of the aqueous solvent include water and alcohol. Examples of the organic solvent include N-methyl-2-pyrrolidone (NMP), and toluene.

Note that, the positive electrode active material may be subjected to roll molding as it is to form a sheet electrode, or to compression molding to form a pellet electrode.

<Negative Electrode>

The negative electrode is appropriately selected depending on the intended purpose without any limitation, provided that the negative electrode contains a negative electrode active material. Examples of the negative electrode include a negative electrode containing a negative electrode collector, and a negative electrode material, which contains a negative electrode active material, provided on the negative electrode collector.

A shape of the negative electrode is appropriately selected depending on the intended purpose without any limitation, and examples thereof include a plate shape.

<<Negative Electrode Material>>

The negative electrode material contains at least a negative electrode active material, and may further contain a binder, an electroconductive agent, etc. according to necessity.

—Negative Electrode Active Material—

The negative electrode active material is appropriately selected depending on the intended purpose without any limitation, provided that the negative electrode active material is a material that functions at least in a nonaqueous solvent system. Examples thereof include: alkali metal ion; alkali earth metal; metal oxide capable of adsorbing and releasing alkali metal ion or alkali earth metal; metal capable of form an alloy with alkali metal ion or alkali earth metal; an alloy containing the metal; a composite alloy compound containing the metal; and a non-reactive electrode due to physical adsorption of ions, such as a carbonaceous material having a large specific surface area. Among them, preferred is a material capable of adsorbing and/or releasing lithium, or lithium ions, or both thereof, in view of the energy density, and more preferred is a non-reactive electrode in view of recycling capability.

Specific examples of the negative electrode active material include: a carbonaceous material; metal oxide capable of adsorbing and releasing lithium, such as antimony-doped tin oxide, and silicon monoxide; metal or alloy capable of form an alloy with lithium, such as aluminum, tin, silicon, and zinc; a composite alloy compound composed of metal capable of forming an alloy with lithium, an alloy containing the metal, and lithium; and lithium metal nitride, such as lithium cobalt nitride. These may be used alone, or in combination. Among them, the carbonaceous material is particularly preferable in view of safety and cost.

Examples of the carbonaceous material include: black-lead (graphite), such as coke, artificial graphite, and natural graphite; and a thermal decomposition product of an organic material under various thermal decomposition conditions. Among them, artificial graphite, and natural graphite are particularly preferable.

—Binder—

The binder is appropriately selected depending on the intended purpose without any limitation, and examples thereof include: a fluorine-based binder, such as polyvinylidene fluoride (PVDF), and polytetrafluoroethylene (PTFE); ethylene-propylene-butadiene rubber (EPBR); styrene-butadiene rubber (SBR); isoprene rubber; and carboxymethyl cellulose (CMC). These may be used alone, or in combination.

Among them, the fluorine-based binder, such as polyvinylidene fluoride (PVDF) and polytetrafluoroethylene (PTFE), and carboxymethyl cellulose (CMC) are preferable, and CMC is particularly preferable, as CMC contributes to improvement in the number of repeated charging-discharging compared to other binders.

—Electroconductive Agent—

Examples of the electroconductive agent include: a metal material, such as copper, and aluminum; and a carbonaceous material, such as carbon black, and acetylene black. These may be used alone, or in combination.

<<Negative Electrode Collector>>

A material, shape, size and structure of the negative electrode collector are appropriately selected depending on the intended purpose without any limitation.

The material of the negative electrode collector is appropriately selected depending on the intended purpose without any limitation, provided that the material thereof is composed of an electroconductive material. Examples thereof include stainless steel, nickel, aluminum, and copper. Among them, stainless steel, and copper are particularly preferable.

The shape of the negative electrode collector is appropriately selected depending on the intended purpose without any limitation.

The size of the negative electrode collector is appropriately selected depending on the intended purpose without any limitation, provided that it is a size appropriately used as a negative electrode collector.

—Preparation Method of Negative Electrode—

The negative electrode can be produced by applying a negative electrode material, which has been formed into slurry by appropriately adding the binder, the electroconductive agent, and a solvent to the negative electrode active material, onto the negative electrode collector, followed by drying. As for the solvent, the aforementioned solvents usable in the production method of the positive electrode can be used.

Moreover, a composition, in which the binder, the electroconductive agent, etc. are added to the negative electrode active material, may be subjected to roll molding as it is to form a sheet electrode or to compression molding to form a pellet electrode. Alternatively, a thin layer of the negative electrode active material may be formed on the negative electrode collector by a method, such as vapor deposition, sputtering, and plating.

<Nonaqueous Electrolyte>

The nonaqueous electrolyte is an electrolytic solution containing a nonaqueous solvent, an electrolyte salt containing a halogen atom, and a compound having a site capable of bonding to an anion containing a halogen atom.

<<Nonaqueous Solvent>>

The nonaqueous solvent is appropriately selected depending on the intended purpose without any limitation, but it is preferably an aprotic organic solvent.

As for the aprotic organic solvent, there is a carbonate-based organic solvent, such as chain carbonate, and cyclic carbonate, and it is preferably a solvent having a low viscosity. Among them, the chain carbonate is preferable, as it has high solubility of the electrolyte salt.

Examples of the chain carbonate include dimethyl carbonate (DMC), diethylcarbonate (DEC), methylethylcarbonate (EMC), and methylpropionate (MP). Among them, dimethyl carbonate (DMC) is preferable.

An amount of DMC is appropriately selected depending on the intended purpose without any limitation, but it is preferably 70% by mass or greater, more preferably 90% by mass or greater, relative to the nonaqueous solvent. When the amount of the DMC is less than 70% by mass and the rest of the solvent is a cyclic compound (e.g., cyclic carbonate, and cyclic ester) having a high dielectric constant, a viscosity of a nonaqueous electrolyte, which is prepared to have a high density, such as 3M or higher, becomes excessively high, as an amount of the cyclic compound having a high dielectric constant is large. As a result, the nonaqueous electrolyte may be penetrated into an electrode, or a problem in diffusion of ions may occur.

Examples of the cyclic carbonate include propylenecarbonate (PC), ethylenecarbonate (EC), butylene carbonate (BC), and vinylene carbonate (VC).

In the case where a mixed solvent prepared by combining ethylenecarbonate (EC) as the cyclic carbonate, with dimethyl carbonate (DMC) as the chain carbonate is used, a mixing ratio of ethylenecarbonate (EC) to dimethyl carbonate (DMC) is appropriately selected depending on the intended purpose without any limitation. The mass ratio (EC:DMC) is preferably 3:10 to 1:99, more preferably 3:10 to 1:20.

Note that, as for the nonaqueous solvent, an ester-based organic solvent, such as cyclic ester, and chain ester, and an ether-based organic solvent, such as cyclic ether, and chain ether, can be optionally used.

Examples of the cyclic ester include γ-butyrolactone (γBL), 2-methyl-γ-butyrolactone, acetyl-γ-butyrolactone, and γ-valerolactone.

Examples of the chain ester include alkyl propionate, dialkyl malonate, alkyl acetate (e.g., methyl acetate (MA), and ethyl acetate), and alkyl formate (e.g., methyl formate (MF), and ethyl formate).

Examples of the cyclic ether include tetrahydrofuran, alkyl tetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, triethylene glycol dialkyl ether, and tetraethylene glycol dialkyl ether.

<<Compound Having Site Capable of Bonding to Anion Containing Halogen Atom>>

The compound having a site capable of bonding to an anion containing a halogen atom is appropriately selected depending on the intended purpose without any limitation, provided that it is capable of bonding to an anion containing a halogen atom, but the compound is preferably a compound capable of chemically bonding to an anion containing a fluorine atom.

The compound having a site capable of bonding to an anion containing a halogen atom (may be also referred to as an "anion receptor" hereinafter) is appropriately selected depending on the intended purpose without any limitation, and examples thereof include a crown ether-based compound, an aza-ether-based compound, an inclusion compound, such as cyclodextrin, a fluoroalkyl boron-based compound, and fluorophenyl boron. Among them, preferred is a compound having a coordinative ability to relatively small anions. Since the present invention aims to capture anion containing the smaller element, a halogen atom, (especially an anion containing a fluorine atom), preferred is a compound having a coordinative ability to relatively small anions. An anion receptor, which can capture large anions, can capture $PF_6^-$, which is an anion. Therefore, use of the anion receptor is not preferable, as it reduces the anion transfer efficiency in a battery.

The compound having the coordinative ability to relatively small anions is a compound containing an element having a coordinative ability to anions, and containing a substituent that reduces the electron density of the element having the coordinative ability to anions to enhance the ability of capturing anions. In combination with such substitute, the element having the coordinative ability to anions can function as a strong Lewis acid site, and can efficiently capture a fluorine component as Lewis base. For example, a compound having, as a main functional backbone, tertiary boron, and as a substituent, a halogen atom, a fluorine-substituted alkyl group, a fluorine-substituted alkoxy group, a fluorine-substituted aryl group, a fluorine-substituted phenoxy group, or a fluorine-substituted allyl group, can be used. Note that, it is also possible to use a compound having tertiary nitrogen as a main functional backbone. Among them, a compound having tertiary boron as a main functional backbone, and a substituent having an electron-withdrawing ability (especially a fluorine substituent) is particularly preferable in view of its high Lewis acidity.

The compound having a site capable of bonding to an anion containing a halogen atom is preferably at least one selected from the group consisting of a compound represented by the following general formula (1) and a compound represented by the following general formula (2).

<General Formula (1)>

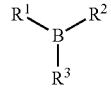

In the general formula (1), $R^1$, $R^2$, and $R^3$ are the same or different, and are each an alkyl group, an aryl group, or a heteroaryl group, each of which may be substituted with a halogen atom, an alkyl group, an alkoxide group, a thiol group, a thioalkoxide group, an aryl group, an ether group, or a thioether group.

The alkyl group is appropriately selected depending on the intended purpose without any limitation, and for example, the alkyl group is preferably a C1-C10 linear-chain, branched, or cyclic alkyl group. Specific examples thereof include a methyl group, an ethyl group, a propyl group, isopropyl group, a butyl group, an isobutyl group, a tert-butyl group, a pentyl group, an isopentyl group, a hexyl group, an isohexyl group, a heptyl group, an isoheptyl group, an octyl group, an isooctyl group, a nonyl group, an isononyl group, a cyclopentyl group, a cyclobutyl group, a cyclopentyl group, a cyclohexyl group, a cycloheptyl group, a cyclooctyl group, and a cyclononyl group.

The aryl group is preferably a C6-C12 aryl group, and examples thereof include a phenyl group, a tolyl group, a xylyl group, a cumenyl group, a styryl group, a mesityl group, a cinnamyl group, a phenethyl group, a benzhydryl group, and a naphthyl group. Among them, a phenyl group is particularly preferable.

Examples of the heteroaryl group include a thienyl group, a pyridyl group, and an indolyl group.

Examples of the halogen atom include a chlorine atom, a bromine atom, and a fluorine atom. Among them, a fluorine atom is particularly preferable.

In the case where $R^1$, $R^2$ and/or $R^3$ has a cyclic structure, $R^1$, $R^2$ and/or $R^3$ preferably has an aromatic cyclic structure, and a bond with boron is preferably formed by directly bonding boron to an aromatic cyclic compound, or bonding boron to the cyclic compound via a substitute that can form a conjugated system with the cyclic compound. Moreover, the substituent bonded to the cyclic compound is preferably a substituent having an electron-withdrawing ability, and a function of reducing the electron density of the ring.

Among them, in the general formula (1), $R^1$, $R^2$ and $R^3$ are preferably the same groups, more preferably phenyl groups, and even more preferably phenyl groups in each of which part or all of hydrogen atoms are substituted with fluorine atoms. $R^1$, $R^2$ and $R^3$ are particularly preferably $-C_6-F_5$ in each of which 5 hydrogen atoms of a phenyl group are all substituted with fluorine atoms, as an electron-deficient state thereof induced by the fluorine atoms having high electron negativity can be delocalized on the aromatic ring, and the fluorine atoms can interact with the electron orbit of boron, which is a centric element, which enables to effectively reduce the electron density on the boron.

The compound represented by the general formula (1) is appropriately selected depending on the intended purpose without any limitation, and examples thereof include a compound represented by the following structural formula (tris(pentafluorophenyl)borane; TPFPB), trimesityl borane, tris(1,2-dimethylpropyl)borane, tris(parafluorophenyl)borane, and tris(parachlorophenyl)borane. Among them, TPFPB represented by the following structural formula is particularly preferable in view of its coordinative ability to anions.

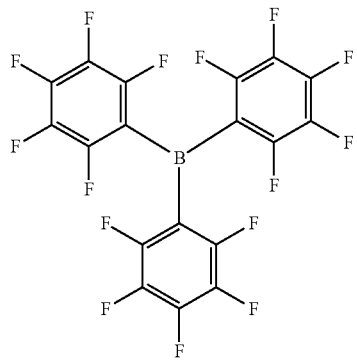

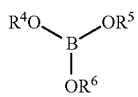

<General Formula (2)>

In the general formula (2), $R^4$, $R^5$ and $R^6$ may be the same or different, and are each an alkyl group, an aryl group, or a heteroaryl group, which may be substituted with a halogen atom, an alkyl group, an alkoxide group, a thiol group, a thioalkoxide group, an aryl group, an ether group, or a thioether group.

As for the alkyl group, aryl group, and heteroaryl group, those listed as the alkyl group, aryl group, and heteroaryl group in the general formula (1) can be used.

Examples of the halogen atom include a chlorine atom, a bromine atom, and a fluorine atom. Among them, a fluorine atom is particularly preferable.

Among those listed above, in the general formula (2), $R^4$, $R^5$, and $R^6$ are preferably the same, more preferably C2-C3 alkyl groups, and even more preferably C2-C3 alkyl groups, in each of which part of or all of hydrogen atoms are substituted with fluorine atoms. $R^4$, $R^5$, and $R^6$ are particularly preferably C2-C3 alkyl groups, in each of which all of the hydrogen atoms are substituted with fluorine atoms, as the electron density of the boron, which is a centric element, can be reduced.

The compound represented by the general formula (2) is appropriately selected depending on the intended purpose without any limitation, and examples thereof include $(CH_3O)_3B$, $(C_3F_7CH_2O)_3B$, $[(CF_3)_2CHO]_3B$, $[(CF_3)_2C(C_6H_5)O]_3B$, $(C_6H_5O)_3B$, $(FC_6H_4O)_3B$, $(F_2C_6H_3O)_3B$, $(F_4C_6HO)_3B$, $(C_6F_5O)_3B$, $(CF_3C_6H_4O)_3B$, $[(CF_3)_2C_6H_3O]_3B$, the compound represented by the following structural formula 2-1 (tris(hexafluoroisopropyl)borate (THFIPB)), the compound represented by the following structural formula 2-2, and $(CF_3O)_3B$. Among them, preferred is the compound represented by the following structural formula 2-1 (THFIPB).

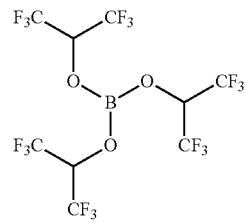

<Structural Formula 2-1>

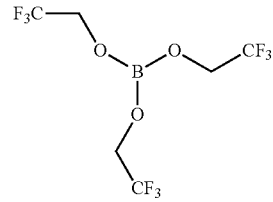

<Structural Formula 2-2>

An amount of the compound having a site capable of bonding to an anion containing a halogen atom is appropriately selected depending on the intended purpose without any limitation, but it is preferably 0.5% by mass or greater, more preferably 0.5% by mass to 5% by mass, and even more preferably 1% by mass to 3% by mass, relative to the nonaqueous electrolyte. When the amount thereof is less than 0.5% by mass, the obtainable effect thereof may not be exhibited sufficiently. When the amount thereof is greater than 5% by mass, the ion diffusibility may be lowered due to the increased viscosity, or a charging-discharging efficiency of a resulting element may be reduced.

Note that, the addition of the compound having a site capable of bonding to an anion containing a halogen atom (e.g., TPFPB, and THFIPB) inside the nonaqueous electrolytic capacitor element can be analyzed by decomposing the nonaqueous electrolytic capacitor element, and analyzing the nonaqueous electrolyte by gas chromatography.

<<Electrolyte Salt Containing Halogen Atom>>

The electrolyte salt containing a halogen atom is not particularly limited, provided that it contains a halogen atom, is dissolved in a nonaqueous solvent, and exhibits high ion conductivity. As for the electrolyte salt containing a halogen atom, a combination of the following cation and the following anion can be used.

Examples of the cation include alkali metal ion, alkali earth metal ion, tetraalkyl ammonium ion, and Spiro quaternary ammonium ion.

Examples of the anion include $Cl^-$, $Br^-$, $I^-$, $ClO_4^-$, $BF_4^-$, $PF_6^-$, $SbF_6^-$, $CF_3SO_3-$, $(CF_3SO_2)_2N^-$, and $(C_2F_5SO_2)_2N^-$.

Among the electrolyte salts containing a halogen atom, a lithium salt is particularly preferable, as use thereof improves a battery capacity.

The lithium salt is appropriately selected depending on the intended purpose without any limitation, and examples thereof include lithium hexafluorophosphate ($LiPF_6$), lithium perchlorate ($LiClO_4$), lithium chloride (LiCl), lithium fluoroborate ($LiBF_4$), lithium hexafluoroarsenate ($LiAsF_6$), lithium trifluorosulfonate ($LiCF_3SO_3$), lithium bistrifluoromethylsulfonyl imide ($LiN(C_2F_5SO_2)_2$), and lithium bisperfluoroethylsulfonyl imide ($LiN(CF_2F_5SO_2)_2$). These may be used alone, or in combination. Among them, $LiPF_6$ is particularly preferable in view of the size of the storage capacity of anions in the carbon electrode.

A concentration of the electrolyte salt is appropriately selected depending on the intended purpose without any limitation, but it is preferably 0.5 mol/L to 6 mol/L in the nonaqueous solvent, more preferably 2 mol/L to 4 mol/L for achieving both a desirable battery capacity and desirable output.

The nonaqueous electrolyte in the nonaqueous electrolytic capacitor element is substantially free from LiF. The reason for this is because, in the case where a fluorine component is present, LiF is precipitated at the side of the negative electrode, which significantly hinders the functions of the negative electrode. Specifically, in a battery where anions are stored in a positive electrode, a fluorine component derived from a decomposition of an electrolyte salt is separated when the electrolyte salt density is high, such as about 3 mol/L, or charging is performed with high voltage, and the fluorine component is gradually precipitated as LiF at the side of the negative electrode. As a result, cations cannot enter or come out from the negative electrode. It is assumed that this phenomenon is caused because LiF is an insulating material. Moreover, the nonaqueous electrolyte for use in the present invention does not need to significantly change (improve) ion conductivity. This is because the electrolyte salt added in advance can be sufficiently dissolved in the nonaqueous solvent for use up to about 5 mol/L, and the concentration of the electrolyte salt is adjusted when the nonaqueous electrolytic capacitor element is designed.

<Separator>

The separator is provided between a positive electrode and a negative electrode for the purpose of preventing a short circuit between the positive electrode and the negative electrode. A material, shape, size, and structure of the separator are appropriately selected depending on the intended purpose without any limitation.

Examples of the material of the separator include: paper, such as kraft paper, vinylon blended paper, and synthetic pulp blended paper; polyolefin nonwoven fabric, such as cellophane, a polyethylene graft membrane, and polypropylene melt-flow nonwoven fabric; polyamide nonwoven fabric; and glass fiber nonwoven fabric.

Examples of the shape of the separator include a sheet shape.

The size of the separator is appropriately selected depending on the intended purpose without any limitation, provided that it is a size that is appropriately used for the nonaqueous electrolytic capacitor element.

The structure of the separator may be a single layer structure, or a multilayer structure.

<Other Members>

Other members are appropriately selected depending on the intended purpose without any limitation, and examples thereof include an outer tin, and an electrode lead wire.

<Production Method of Nonaqueous Electrolytic Capacitor Element>

The nonaqueous electrolytic capacitor element of the present invention can be produced by assembling the positive electrode, the negative electrode, the nonaqueous electrolyte, and the optional separator into an appropriate shape. Moreover, other members, such as an outer tin be used according to the necessity. A method for assembling the nonaqueous electrolytic capacitor element is appropriately selected from generally employed methods without any limitation.

The nonaqueous electrolytic capacitor element of the present invention is appropriately selected depending on the intended purpose without any limitation, but the maximum voltage during the charging and discharging thereof is preferably 4.5 V to 6.0 V. When the maximum voltage during the charging and discharging is lower than 4.5 V, anions cannot be sufficiently accumulated, which may reduce the capacity of the element. When the maximum voltage is higher than 6.0 V, decomposition of the solvent or electrolyte salt tends to be caused, which accelerate deterioration of the element. In the case where charging is performed with 4.5 V or higher, moreover, a compound that may undergo a reaction, such as decomposition, at the corresponding potential of the positive electrode is not preferable as the compound having a site capable of bonding to an anion containing a halogen atom. In such case, it is desirable to use the compound having a site capable of bonding to an anion containing a halogen atom, which has oxidation resistance. Among them, TPFPB, and THPIPB are suitably used.

Figure 2:
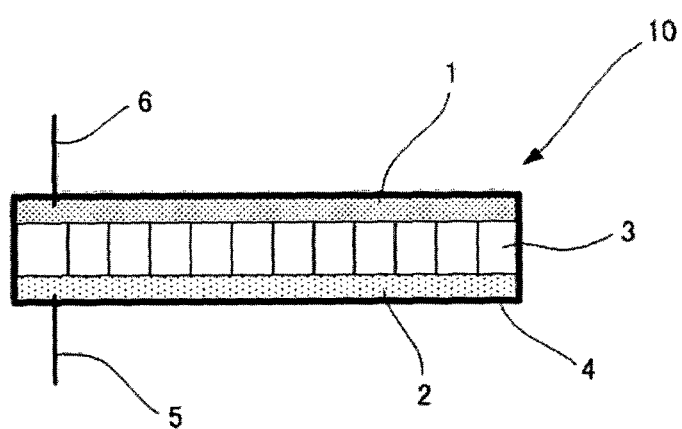
FIG. 2 is a schematic diagram illustrating one example of the nonaqueous electrolytic capacitor element of the present invention.

FIG. 2 is a schematic diagram illustrating one example of the nonaqueous electrolytic capacitor element of the present invention. The nonaqueous electrolytic capacitor element 10 contains, in an outer tin 4, a positive electrode 1 containing a positive electrode active material capable of intercalation and deintercalation of anions, a negative electrode 2 containing a negative electrode active material capable of adsorbing and/or releasing metal lithium, lithium ion, or both thereof, and a separator 3 between the positive electrode 1 and the negative electrode 2. These positive electrode 1, negative electrode 2, and separator 3 are immersed in a nonaqueous electrolyte (not illustrated) prepared by dissolving lithium salt in a nonaqueous solvent. Note that, "5" denotes a negative electrode lead wire, and "6" denotes a positive electrode lead wire.

—Shape—

A shape of the nonaqueous electrolytic capacitor element of the present invention is not particularly limited, and it may be appropriately selected from carious shapes typically employed depending on use thereof. Examples of the shape thereof include a cylinder element where a sheet electrode and a separator are spirally provided, a cylinder element having an inside-out structure, in which a pellet electrode and a separator are used in combination, and a coin element, in which a pellet electrode and a separator are laminated.

<Use>

Use of the nonaqueous electrolytic capacitor element of the present invention is not particularly limited, and it may be used for various applications. Examples thereof include a laptop computer, a stylus-operated computer, a mobile computer, an electronic book player, a mobile phone, a mobile fax, a mobile printer, a headphone stereo, a video movie, a liquid crystal television, a handy cleaner, a portable CD, a minidisk, a transceiver, an electronic organizer, a calculator, a memory card, a mobile tape recorder, a radio, a back-up power supply, a motor, a lighting equipment, a toy, a game equipment, a clock, a strobe, and a camera.

EXAMPLES

Examples of the present invention are explained hereinafter, but Examples shall not be construed to limit the scope of the present invention.

Note that, Examples are examples where the "nonaqueous electrolytic capacitor element" of the present invention is used as a "nonaqueous electrolyte secondary batter."

Example 1

—Production of Nonaqueous Electrolyte Secondary Battery—

<Production of Positive Electrode>

As for a positive electrode active material, carbon powder (KS-6, manufactured by TIMCAL Ltd.) was used. The carbon powder had a BET specific surface area by nitrogen adsorption of 20 m$^2$/g, and had the average particle diameter (median diameter) of 3.4 μm as measured by a laser diffraction particle size analyzer (SALD-2200, manufactured by Shimadzu Corporation).

To 2.7 g of the carbon powder (KS-6, manufactured by TIMCAL Ltd.) and 0.2 g of an electroconductive agent (acetylene black), water was added, and the resulting mixture was kneaded. To the resultant, 5 g of a 2% by mass carboxy methyl cellulose (CMC) aqueous solution was further added as a thickener, and the resulting mixture was kneaded to produce slurry. The slurry was applied onto an aluminum foil, followed by vacuum drying for 4 hours at 120° C., to thereby prepare a positive electrode. A circle having a diameter of 16 mm was stamped out of the positive electrode, to thereby form an electrode of the positive electrode. A mass of the carbon powder (graphite) coated on the aluminum (Al) foil having a diameter of 16 mm in the positive electrode was 10 mg.

<Production of Negative Electrode>

As for a negative electrode active material, carbon powder (MAGD, manufactured by Hitachi Chemical Co., Ltd.) was used. The carbon powder had a BET specific surface area by nitrogen adsorption of 4,600 m$^2$/g, the average particle diameter (median diameter) of 20 μm as measured by a laser diffraction particle size analyzer (SALD-2200, manufactured by Shimadzu Corporation), and a tap density of 630 kg/m$^3$.

To 3 g of the carbon powder (graphite) and 0.15 g of an electroconductive agent (acetylene black), water was added, and the resulting mixture was kneaded. To the resultant, 4 g of a 3% by mass carboxy methyl cellulose (CMC) aqueous solution was further added as a thickener, and the resulting mixture was kneaded to thereby produce slurry. The slurry was applied onto a Cu foil, followed by vacuum drying for 4 hours at 120° C., to thereby form a negative electrode. A circle having a diameter of 16 mm was stamped out of the negative electrode, to thereby prepare an electrode of the negative electrode. A mass of the carbon powder (graphite) coated on the Cu foil having the diameter of 16 mm in the negative electrode was 10 mg.

<Nonaqueous Electrolyte>

As for a nonaqueous electrolyte, 0.3 mL of dimethyl carbonate (DMC), in which 4 mol/L of LiPF$_6$ had been dissolved, was prepared.

Into the dimethyl carbonate (DMC), in which 4 mol/L of LiPF$_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 0% by mass (Comparative Product), 0.5% by mass (Present Invention Product 1), 1.0% by mass (Present Invention Product 2), and 2.5% by mass (Present Invention Product 3).

<Separator>

As for a separator, a laboratory filter paper (GA-100 GLASS FIBER FILTER, manufactured by ADVANTEC GROUP) was prepared.

<Production of Battery>

In an argon dry box, the produced positive electrode and negative electrode were provided adjacent to each other with the separator being present between the positive electrode and the negative electrode as illustrated in FIG. 2, to thereby produce a semi-open cell type nonaqueous electrolyte secondary battery.

Next, each of the produced nonaqueous electrolyte secondary batteries was subjected to an evaluation of repetitive charging-discharging property in the following manner. The results are presented in Table 1 and FIG. 3.

<Evaluation of Repetitive Charging-Discharging Property>

Each of the produced nonaqueous electrolyte secondary batteries was charged at room temperature (25° C.) to a charge termination voltage of 5.2 V at a constant current of 0.5 mA/cm$^2$. After the first charging, the nonaqueous electrolyte secondary battery was discharged to 2.5 V at a constant current of 0.5 mA/cm$^2$. This cycle of charging and discharging was repeated 50 times. The battery capacity (discharge capacity and charge capacity) after the first cycle to the 50$^{th}$ cycle was measured by a charge-discharge test device (HJ-SD8 System, manufactured by Hokuto Denko Corporation). Note that, the battery capacity was a mass conversion value per 10 mg of the positive electrode active material.

TABLE 1

|  | Amount of TPFPB (% by mass) | Discharge capacity after 50$^{th}$ cycle (mAh/mass (g) of positive electrode active material) |
|---|---|---|
| Comparative Product | 0 | 8 |
| Present Invention Product 1 | 0.5 | 19.5 |
| Present Invention Product 2 | 1.0 | 84 |
| Present Invention Product 3 | 2.5 | 78 |

Figure 3:
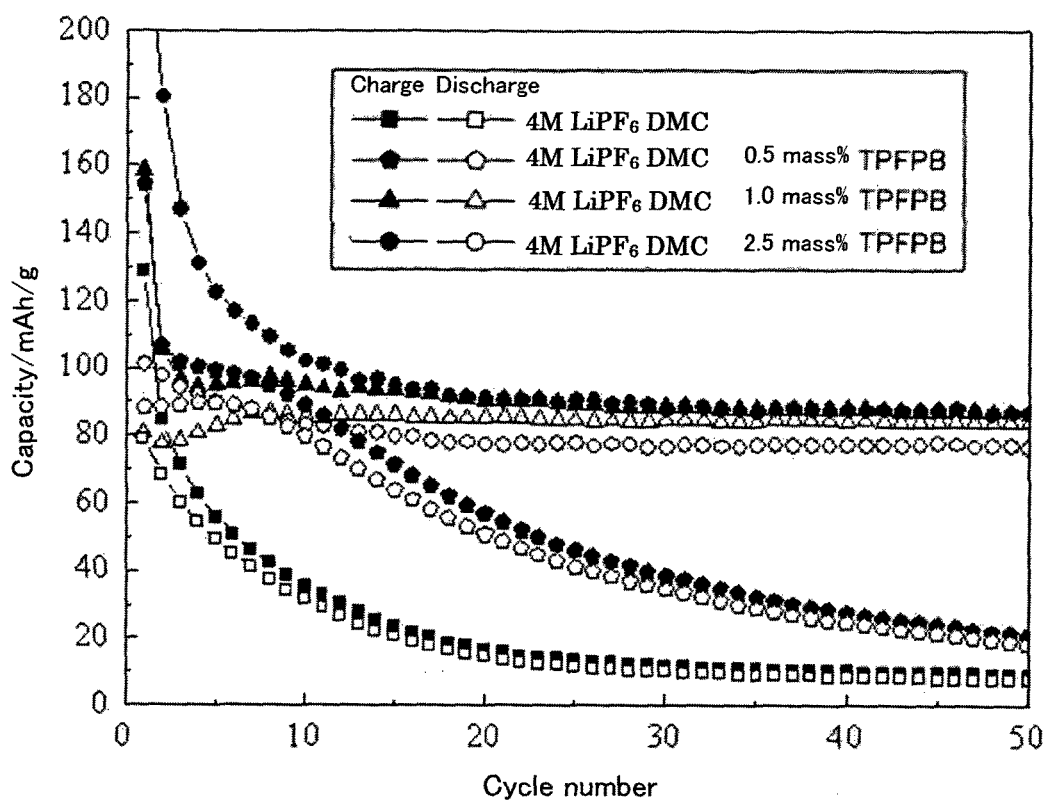
FIG. 3 is a graph depicting a relationship between the charging-discharging cycles and the capacity in Example 1.

It was seen from the results presented in Table 1 and FIG. 3 that Present Invention Products 2 to 3, which respectively contained 1.0% by mass and 2.5% by mass of TPFPB, had the discharge capacity of 80 mAh/mass (g) of positive electrode active material after the 50$^{th}$ cycle of charging and discharging, and Comparative Product, which did not contain TPFPB, had the discharge capacity of 10 mAh/mass (g) of positive electrode active material after the 50$^{th}$ cycle of charging and discharging. The effect of improving the durability to repetitive use owing to the addition of TPFPB was confirmed.

Note that, Present Invention Product 1, in which the amount of TPFPB was 0.5% by mass, gradually lowered its battery capacity after the 10$^{th}$ cycle.

Moreover, it was found from the results presented in FIG. 3 that the nonaqueous electrolyte secondary batteries of Present Invention Products 2 and 3, which contained TPFPB, had less deterioration due to repetitive use. As TPFPB was not added, Comparative Product significantly reduced its battery capacity after the 2$^{nd}$ cycle.

Example 2 and Comparative Example 1

—Production of Nonaqueous Electrolyte Secondary Battery—

<Positive Electrode>

The same positive electrode to that of Example 1 was prepared.

<Negative Electrode>

The same negative electrode to that of Example 1 was prepared.

<Nonaqueous Electrolyte>

As for a nonaqueous electrolyte, 0.3 mL of dimethyl carbonate (DMC), in which 4 mol/L of $LiPF_6$ had been dissolved, was prepared.

Into the dimethyl carbonate (DMC), in which 4 mol/L of $LiPF_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 0% by mass (Comparative Example 1), and 1.0% by mass (Example 2).

<Separator>

As for a separator, a laboratory filter paper (GA-100 GLASS FIBER FILTER, manufactured by ADVANTEC GROUP) was prepared.

<Production of Battery>

In an argon dry box, the produced positive electrode and negative electrode were provided adjacent to each other with the separator being present between the positive electrode and the negative electrode as illustrated in FIG. 2, to thereby produce a semi-open cell type nonaqueous electrolyte secondary battery.

<Evaluation of Repetitive Charging-Discharging Property>

Next, each of the produced nonaqueous electrolyte secondary batteries was subjected to an evaluation of repetitive charging-discharging property in the same manner as in Example 1.

The nonaqueous electrolyte secondary batteries of Examples 2 and Comparative Example 1 after $50^{th}$ cycle of charging and discharging were each disassembled to take out the positive electrode and the negative electrode. The cross-sections of the taken out positive electrode and negative electrode were subjected to SEM-EDX elemental analysis. The results are each presented in FIGS. 4A to 4D, 5A to 5D, 6A to 6D, and 7A to 7E.

Figure 4A:
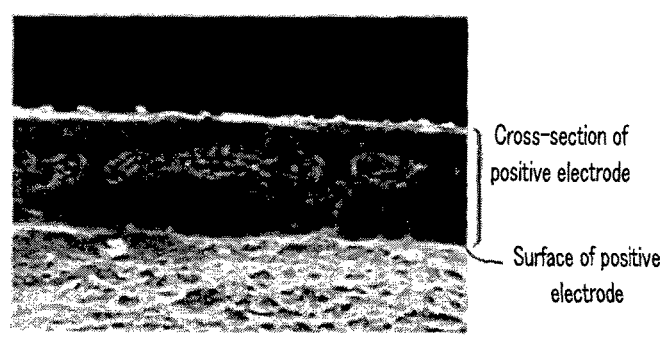
FIG. 4A is a SEM photograph illustrating a cross-section of the positive electrode after $50^{th}$ cycle in Comparative Example 1, which uses a dimethyl carbonate (DMC) electrolytic solution, into which 4 mol/L of $LiPF_6$ has been dissolved, without adding TPFPB.

FIG. 4A is a SEM photograph depicting a cross-section of the positive electrode after $50^{th}$ cycle in Comparative Example 1, where used is the dimethyl carbonate (DMC) electrolytic solution, in which 4 mol/L of $LiPF_6$ is dissolved, without adding TPFPB.

Figure 4B:
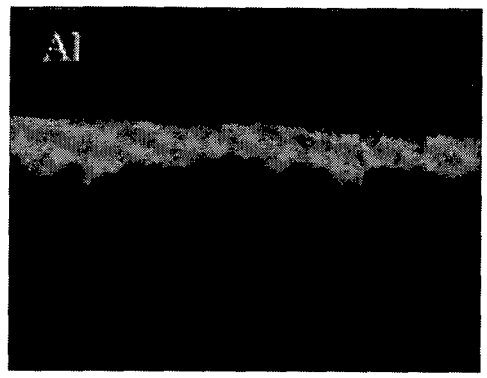
FIG. 4B is a diagram depicting the results of aluminum (Al) element distribution obtained by a SEM-EDX elemental analysis of a cross-section of the positive electrode after $50^{th}$ cycle in Comparative Example 1, where used is the dimethyl carbonate (DMC) electrolytic solution, in which 4 mol/L of $LiPF_6$ is dissolved, without adding TPFPB.
Figure 4C:
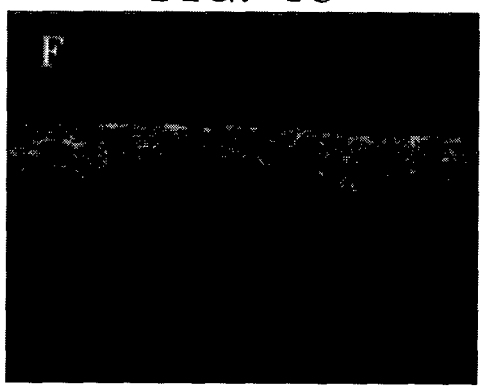
FIG. 4C is a diagram depicting the results of fluorine (F) element distribution obtained by a SEM-EDX elemental analysis of a cross-section of the positive electrode after $50^{th}$ cycle in Comparative Example 1, where used is the dimethyl carbonate (DMC) electrolytic solution, in which 4 mol/L of $LiPF_6$ is dissolved, without adding TPFPB.
Figure 4D:
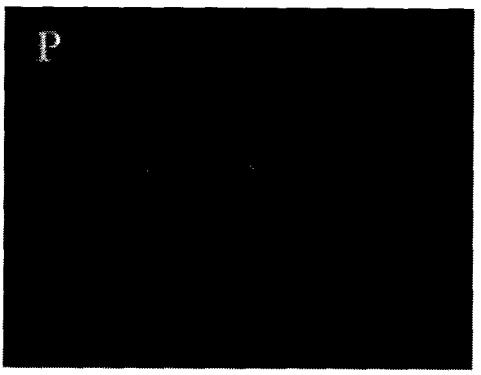
FIG. 4D is a diagram depicting the results of phosphorus (P) element distribution obtained by a SEM-EDX elemental analysis of a cross-section of the positive electrode after $50^{th}$ cycle in Comparative Example 1, where used is the dimethyl carbonate (DMC) electrolytic solution, in which 4 mol/L of $LiPF_6$ is dissolved, without adding TPFPB.

FIGS. 4B to 4D are each a SEM-EDX elemental photograph of a cross-section of the positive electrode after $50^{th}$ cycle in Comparative Example 1, where used is the dimethyl carbonate (DMC) electrolytic solution, in which 4 mol/L of $LiPF_6$ is dissolved, without adding TPFPB.

Figure 5A:
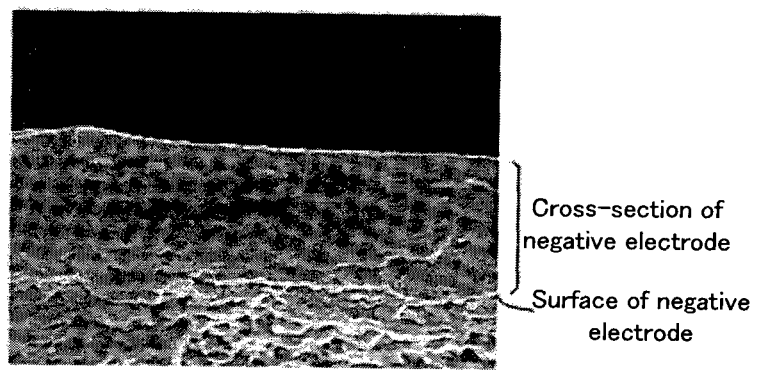
FIG. 5A is a SEM photograph of a cross-section of a negative electrode after $50^{th}$ cycle in Comparative Example 1, where used is the dimethyl carbonate (DMC) electrolytic solution, in which 4 mol/L of $LiPF_6$ is dissolved, without adding TPFPB.

FIG. 5A is a SEM photograph of a cross-section of a negative electrode after $50^{th}$ cycle in Comparative Example 1, where used is the dimethyl carbonate (DMC) electrolytic solution, in which 4 mol/L of $LiPF_6$ is dissolved, without adding TPFPB.

Figure 5B:
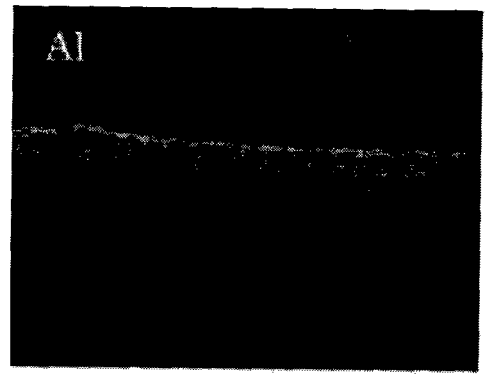
FIG. 5B is a diagram depicting the results of aluminum (Al) element distribution obtained by a SEM-EDX elemental analysis of a cross-section of the negative electrode after $50^{th}$ cycle in Comparative Example 1, where used is the dimethyl carbonate (DMC) electrolytic solution, in which 4 mol/L of $LiPF_6$ is dissolved, without adding TPFPB.
Figure 5C:
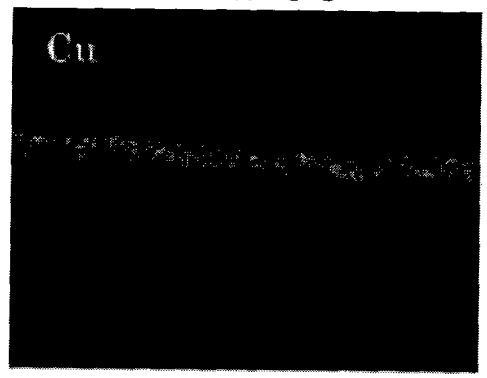
FIG. 5C is a diagram depicting the results of copper (Cu) element distribution obtained by a SEM-EDX elemental analysis of a cross-section of the negative electrode after $50^{th}$ cycle in Comparative Example 1, where used is the dimethyl carbonate (DMC) electrolytic solution, in which 4 mol/L of $LiPF_6$ is dissolved, without adding TPFPB.
Figure 5D:
FIG. 5D is a diagram depicting the results of fluorine (F) element distribution obtained by a SEM-EDX elemental analysis of a cross-section of the negative electrode after $50^{th}$ cycle in Comparative Example 1, where used is the dimethyl carbonate (DMC) electrolytic solution, in which 4 mol/L of $LiPF_6$ is dissolved, without adding TPFPB.

FIGS. 5B to 5D are each a SEM-EDX elemental photograph of a cross-section of the negative electrode after $50^{th}$ cycle in Comparative Example 1, where used is the dimethyl carbonate (DMC) electrolytic solution, in which 4 mol/L of $LiPF_6$ is dissolved, without adding TPFPB.

Figure 6A:
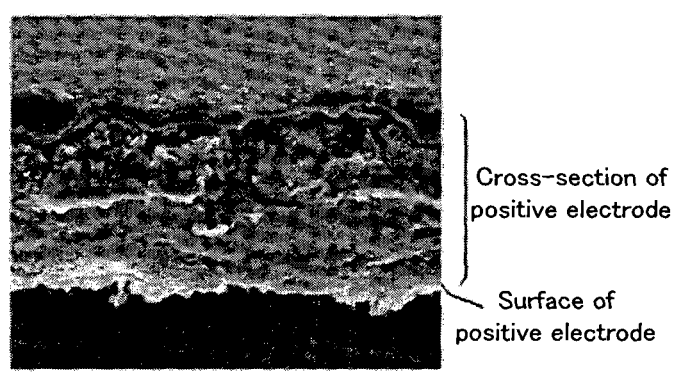
FIG. 6A is a SEM photograph depicting a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 6B:
FIG. 6B is a diagram depicting the results of aluminum (Al) element distribution obtained by a SEM-EDX elemental analysis of a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 6C:
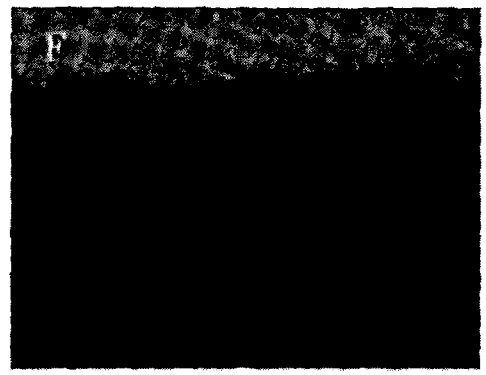
FIG. 6C is a diagram depicting the results of fluorine (F) element distribution obtained by a SEM-EDX elemental analysis of a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 6D:
FIG. 6D is a diagram depicting the results of phosphorus (P) element distribution obtained by a SEM-EDX elemental analysis of a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added.

FIG. 6A is a SEM photograph depicting a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added. FIGS. 6B to 6D are each a SEM-EDX elemental photograph of a cross-section of the positive electrode after $50^{th}$ cycle in Example 2, where used is the dimethyl carbonate (DMC) electrolytic solution, in which 4 mol/L of $LiPF_6$ is dissolved, to which 1% by mass of TPFPB is added.

Figure 7A:
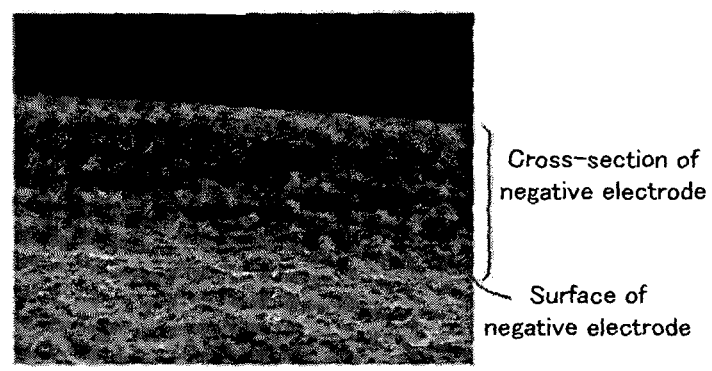
FIG. 7A is a SEM photograph depicting a cross-section of the negative electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 7B:
FIG. 7B is a diagram depicting the results of aluminum (Al) element distribution obtained by a SEM-EDX elemental analysis of a cross-section of the negative electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 7C:
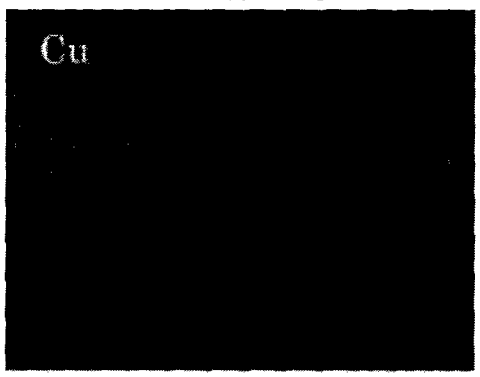
FIG. 7C is a diagram depicting the results of copper (Cu) element distribution obtained by a SEM-EDX elemental analysis of a cross-section of the negative electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 7D:
FIG. 7D is a diagram depicting the results of fluorine (F) element distribution obtained by a SEM-EDX elemental analysis of a cross-section of the negative electrode after $50^{th}$ cycle in Example 2, where used is the dimethyl carbonate (DMC) electrolytic solution, in which 4 mol/L of $LiPF_6$ is dissolved, to which 1% by mass of TPFPB is added.
Figure 7E:
FIG. 7E is a diagram depicting the results of phosphorus (P) element distribution obtained by a SEM-EDX elemental analysis of a cross-section of the negative electrode after 50$^{th}$ cycle in Example 2, where used is the dimethyl carbonate (DMC) electrolytic solution, in which 4 mol/L of LiPF$_6$ is dissolved, to which 1% by mass of TPFPB is added.

FIG. 7A is a SEM photograph depicting a cross-section of the negative electrode after $50^{th}$ cycle in Example 2, where used is the dimethyl carbonate (DMC) electrolytic solution, in which 4 mol/L of $LiPF_6$ is dissolved, to which 1% by mass of TPFPB is added. FIGS. 7B to 7E are each a SEM-EDX elemental photograph of a cross-section of the negative electrode after $50^{th}$ cycle in Example 2, where used is the dimethyl carbonate (DMC) electrolytic solution, in which 4 mol/L of $LiPF_6^-$ is dissolved, to which 1% by mass of TPFPB is added.

Once the nonaqueous electrolyte secondary battery is charged, $LiPF_6$ in the nonaqueous electrolyte is dissociated and $PF_6^-$, which is a dissociated anion, is inserted into the positive electrode. In this process, part of $PF_6^-$ is decomposed to release a fluorine ion. If $PF_6^-$ can be present without being estranged, fluorine ions are present in the nonaqueous electrolyte, or in the positive electrode or negative electrode.

It was found from FIGS. 4B and 4C that, in the case where TPFPB was not added as the compound having a site capable of bonding to an anion containing a halogen atom to the nonaqueous electrolyte of Comparative Example 1, the fluorine (F) element was detected to match the distribution of the aluminum (Al) element of the positive electrode foil, and F was present in the positive electrode foil Al. In the case where TPFPB was not added as the compound having a site capable of bonding to an anion containing a halogen atom to the nonaqueous electrolyte, moreover, it was found from FIGS. 5C and 5D that the fluorine (F) element was detected to match the distribution of the copper (Cu) element of the negative electrode foil, and F was present in the negative electrode foil Cu.

Meanwhile, in the case where TPFPB was added as the compound having a site capable of bonding to an anion containing a halogen atom to the nonaqueous electrolyte of Example 2, as depicted in FIGS. 6B, 6C, 7C, and 7D, any significant presence of a fluorine (F) element on the electrode foil was not observed. Especially, it was found that the fluorine (F) concentration of the positive electrode foil Al was low.

These results indicate that TPFPB added to the nonaqueous electrolyte traps fluorine ions, so that fluorine ions dissociated from $PF_6^-$ cover a surface of the electrode to enhance internal resistance, and not to cause deterioration of the electrode, such as hindering of high output. It is assumed that, as a result of the above, reduction in the battery capacity during the repetitive charging and discharging can be prevented with the electrolytic solution having high concentration, i.e., 4 mol/L, of the electrolyte salt.

Example 3

—Production of Nonaqueous Electrolyte Secondary Battery—

——Evaluation of Repetitive Charging-Discharging Property with Varying Ratios of EC and DMC——

<Positive Electrode>

The same positive electrode to that of Example 1 was prepared.

<Negative Electrode>

A negative electrode formed of metal Li having a diameter of 16 mm, and a thickness of 0.3 mm was prepared.

<Nonaqueous Electrolyte>

As for a nonaqueous electrolyte, five types of a nonaqueous solvent [dimethyl carbonate (DMC) alone, ethylenecarbonate (EC):DMC=1:5 (mass ratio), EC:DMC=1:4 (mass ratio), EC:DMC=1:3 (mass ratio), and EC:DMC=1:2 (mass ratio)], in which 5 mol/L of $LiPF_6$ had been dissolved were each prepared in an amount of 0.3 mL.

Into each nonaqueous solvent, in which 5 mol/L of $LiPF_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 2.5% by mass.

<Separator>

As for a separator, a laboratory filter paper (GA-100 GLASS FIBER FILTER, manufactured by ADVANTEC GROUP) was prepared.

<Production of Battery>

In an argon dry box, the produced positive electrode and negative electrode were provided adjacent to each other with the separator being present between the positive electrode and the negative electrode as illustrated in FIG. 2, to thereby produce a semi-open cell type nonaqueous electrolyte secondary battery.

Next, each of the produced nonaqueous electrolyte secondary batteries was subjected to an evaluation of repetitive charging-discharging property in the following manner.

<Evaluation of Repetitive Charging-Discharging Property>

Each of the produced nonaqueous electrolyte secondary batteries was charged at room temperature (25° C.) to a charge termination voltage of 5.4 V at a constant current of 0.5 mA/cm$^2$. After the first charging, the nonaqueous electrolyte secondary battery was discharged to 3.0 V at a constant current of 0.5 mA/cm$^2$. This cycle of charging and discharging was repeated 30 times. The battery capacity (discharge capacity and charge capacity) after the first cycle to the 30$^{th}$ cycle was measured by a charge-discharge test device (HJ-SD8 System, manufactured by Hokuto Denko Corporation). Note that, the battery capacity was a mass conversion value per 10 mg of the positive electrode active material. The results are presented in FIG. 8.

Figure 8:
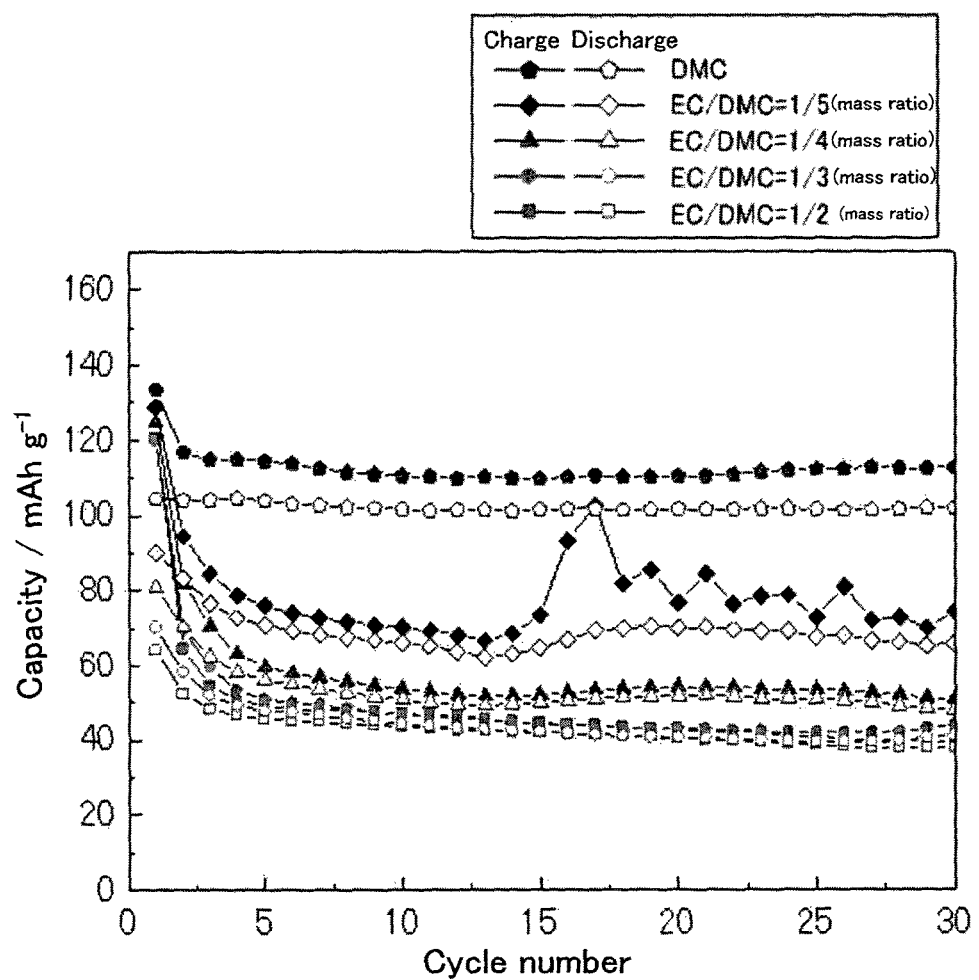
FIG. 8 is a graph depicting a relationship between the charging-discharging cycles and the battery capacity of Example 3.

It was found from the results of FIG. 8 that the battery capacity was high, when the mass ratio of DMC in the mass ratio between EC and DMC was high. Moreover, the battery capacity of 60 (mAh/mass (g) of positive electrode active material) was obtained when the mass ratio of EC to DMC was up to about 3:7, and therefore it was found that the nonaqueous electrolyte, in which EC was added to DMC, could be also used.

Example 4

—Production of Nonaqueous Electrolyte Secondary Battery—

——Selection of Nonaqueous Solvent——

<Positive Electrode>

The same positive electrode to that of Example 1 was prepared.

<Negative Electrode>

The same negative electrode to that of Example 1 was prepared.

<Nonaqueous Electrolyte>

As for a nonaqueous electrolyte, six types of a nonaqueous solvent [dimethyl carbonate (DMC), ethylmethylcarbonate (EMC):DMC=1:5 (mass ratio), methyl acetate (MA):DMC=1:5 (mass ratio), methyl formate (MF):DMC=1:5 (mass ratio), diethylcarbonate (DEC):DMC=1:5, and methyl propionate (MP):DMC=1:5], in which 4 mol/L of $LiPF_6$ had been dissolved, were each prepared in an amount of 0.3 mL.

Into each nonaqueous solvent, in which 4 mol/L of $LiPF_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 0% by mass, 0.5% by mass, 1.0% by mass, and 2.5% by mass.

<Separator>

As for a separator, a laboratory filter paper (GA-100 GLASS FIBER FILTER, manufactured by ADVANTEC GROUP) was prepared.

<Production of Battery>

In an argon dry box, the produced positive electrode and negative electrode were provided adjacent to each other with the separator being present between the positive electrode and the negative electrode as illustrated in FIG. 2, to thereby produce a semi-open cell type nonaqueous electrolyte secondary battery.

Next, each of the produced nonaqueous electrolyte secondary batteries was subjected to an evaluation of repetitive charging-discharging property in the same manner as in Example 3, and was evaluated based on the following evaluation criteria. The results are presented in Table 2.

[Evaluation Criteria]

A: The discharge capacity after the 30$^{th}$ cycle of charging and discharging was 50 mAh/mass (g) of positive electrode active material, or greater.

B: The discharge capacity after the 30$^{th}$ cycle of charging and discharging was less than 50 mAh/mass (g) of positive electrode active material.

TABLE 2

| Amount of TPFPB (% by mass) | DMC | EMC/DMC | MA/DMC | MF/DMC | DEC/DMC | MP/DMC |
|---|---|---|---|---|---|---|
| 0 | B | B | B | B | B | B |
| 0.5 | B | B | B | B | B | B |
| 1.0 | A | A | A | A | A | A |
| 2.5 | A | A | A | A | A | A |

It was found from the results of Table 2 that excellent repetitive charge-discharging property could be obtained, other than use of DMC alone as the nonaqueous solvent, with use of a combination with DMC and a solvent selected from the group consisting of DEC, EMC, MP, MA and MF.

Example 5

—Production of Nonaqueous Electrolyte Secondary Battery—
——Charging-Discharging Voltage——
<Positive Electrode>

The same positive electrode to that of Example 1 was prepared.
<Negative Electrode>

The same negative electrode to that of Example 1 was prepared.
<Nonaqueous Electrolyte>

As for a nonaqueous electrolyte, 0.3 mL of dimethyl carbonate (DMC), in which 1 mol/L of $LiPF_6$ had been dissolved, was prepared.

Into the dimethyl carbonate (DMC), in which 1 mol/L of $LiPF_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 0% by mass, and 0.5% by mass.
<Separator>

As for a separator, a laboratory filter paper (GA-100 GLASS FIBER FILTER, manufactured by ADVANTEC GROUP) was prepared.
<Production of Battery>

In an argon dry box, the produced positive electrode and negative electrode were provided adjacent to each other with the separator being present between the positive electrode and the negative electrode as illustrated in FIG. 2, to thereby produce a semi-open cell type nonaqueous electrolyte secondary battery.

Next, each of the produced nonaqueous electrolyte secondary batteries was subjected to an evaluation of repetitive charging-discharging property with varying charging-discharging voltage, in the following manner, and was evaluated based on the following evaluation criteria. The results are presented in Table 3.
<Evaluation of Repetitive Charging-Discharging Property>

Each of the produced nonaqueous electrolyte secondary batteries was charged at room temperature (25° C.) to a charge termination voltage of 3.0 V at a constant current of 0.5 mA/cm². After the first charging, the nonaqueous electrolyte secondary battery was discharged to 2.5 V at a constant current of 0.5 mA/cm². This cycle of charging and discharging was repeated 30 times. The battery capacity (discharge capacity and charge capacity) after the first cycle to the $30^{th}$ cycle was measured by a charge-discharge test device (HJ-SD8 System, manufactured by Hokuto Denko Corporation), and the results were evaluated based on the following criteria. Note that, the battery capacity was a mass conversion value per 10 mg of the positive electrode active material. The results are presented in Table 3.

Each of the produced nonaqueous electrolyte secondary batteries was charged at room temperature (25° C.) to a charge termination voltage of 4.2 V at a constant current of 0.5 mA/cm². After the first charging, the nonaqueous electrolyte secondary battery was discharged to 3.0 V at a constant current of 0.5 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 4.5 V at a constant current of 0.5 mA/cm². After the first charging, the nonaqueous electrolyte secondary battery was discharged to 3.0 V at a constant current of 0.5 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 5.0 V at a constant current of 1.0 mA/cm². After the first charging, the nonaqueous electrolyte secondary battery was discharged to 3.0 V at a constant current of 1.0 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 5.5 V at a constant current of 1.0 mA/cm². After the first charging, the nonaqueous electrolyte secondary battery was discharged to 3.0 V at a constant current of 1.0 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 6.0 V at a constant current of 1.0 mA/cm². After the first charging, the nonaqueous electrolyte secondary battery was discharged to 3.0 V at a constant current of 1.0 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 6.5 V at a constant current of 1.0 mA/cm². After the first charging, the nonaqueous electrolyte secondary battery was discharged to 3.0 V at a constant current of 1.0 mA/cm². This cycle of charging and discharging was repeated 30 times. The battery capacity after the $30^{th}$ cycle was measured in the same manner to the above, and the results were evaluated based on the following criteria. The results are presented in Table 3.

Each of the produced nonaqueous electrolyte secondary batteries was charged at room temperature (25° C.) to a charge termination voltage of 7.0 V at a constant current of 1.0 mA/cm². After the first charging, the nonaqueous electrolyte secondary battery was discharged to 3.0 V at a constant current of 1.0 mA/cm². This cycle of charging and discharging was repeated 30 times. The battery capacity after the $30^{th}$ cycle was measured in the same manner to the above, and the results were evaluated based on the following criteria. The results are presented in Table 3.

[Evaluation Criteria]
A: The discharge capacity after $30^{th}$ cycle of charging discharging was 30 mAh/mass (g) of the positive electrode active material, or greater.

B: The discharge capacity after 30$^{th}$ cycle of charging discharging was less than 30 mAh/mass (g) of the positive electrode active material.

TABLE 3

| Charging-discharging voltage range (V) | Battery capacity after 30$^{th}$ cycle Without TPFPB | Battery capacity after 30$^{th}$ cycle With 2.5% by mass of TPFPB |
|---|---|---|
| 2.5 to 3.0 | B | B |
| 2.5 to 4.2 | B | B |
| 2.5 to 4.5 | A | A |
| 2.5 to 5.0 | A | A |
| 2.5 to 5.5 | A | A |
| 2.5 to 6.0 | B | A |
| 2.5 to 6.5 | B | B |
| 2.5 to 7.0 | B | B |

As seen from the results of Table 3, in the case where no TPFPB was added, intercalation of anions to the positive electrode was insufficient when the maximum voltage of the voltage range during charging and discharging was 4.2 V or lower. When the maximum voltage was higher than 5.5 V, on the other hand, the nonaqueous electrolyte was decomposed to reduce the discharge capacity. In the case where TPFPB was added, however, 30 (mAh/mass (g) of positive electrode active material) or higher of the discharge capacity was attained even when the maximum voltage was higher than 5.5 V, and therefore it was found that properties with high voltage could be improved.

Comparative Example 2

—Potential Change of Positive and Negative Electrodes in 3-Electrode Cell—

As for a 3-electrode cell having a positive electrode (the positive electrode of Example 1), a negative electrode (the negative electrode of Example 1), a nonaqueous electrolyte (a nonaqueous solvent in which 1 mol/L of LiPF$_6$ had been dissolved (EC:DMC=3:7 (mass ratio))), and a separator (the separator of Example 1), a commercial product (simple cell with RE for LIB test) manufactured by Takumi Giken was used.

Note that, tris(pentafluorophenyl)borane (TPFPB) as the compound having a site capable of bonding to an anion containing a halogen atom was not added. As for a reference electrode, Li metal was used.

Figure 9:
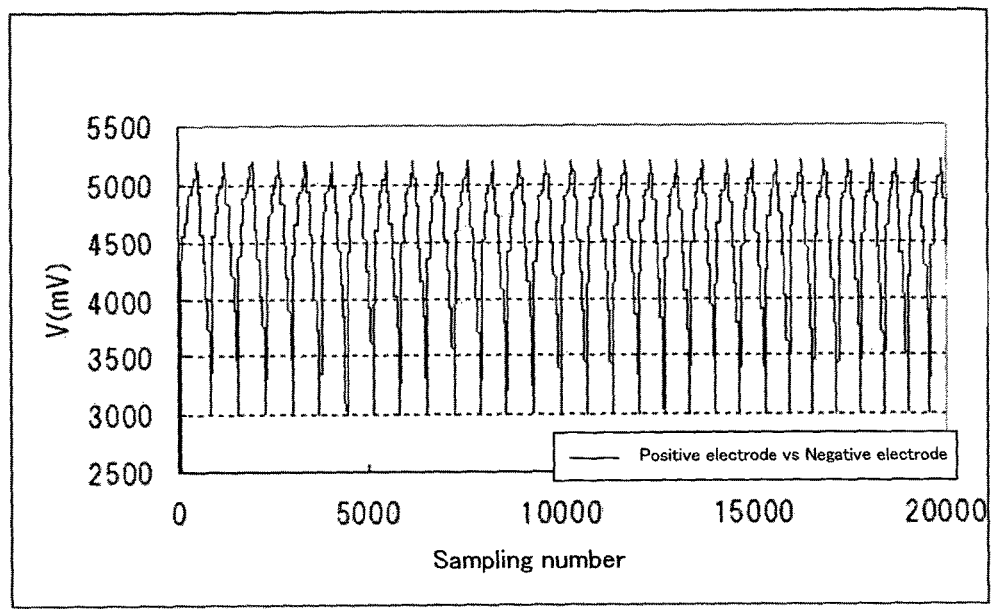
FIG. 9 is a graph depicting, in the longitudinal axis, the voltage between the positive electrode terminal and the negative electrode terminal along the charging-discharging cycles in Comparative Example 2, and the sampling number in the horizontal axis.

FIG. 9 depicts the data where the voltage between the positive electrode terminal and the negative electrode terminal along the charging-discharging cycles using the 3-electrode cell is presented in the longitudinal axis, and the sampling number (equivalent to time) is presented in the horizontal axis.

Figure 10:
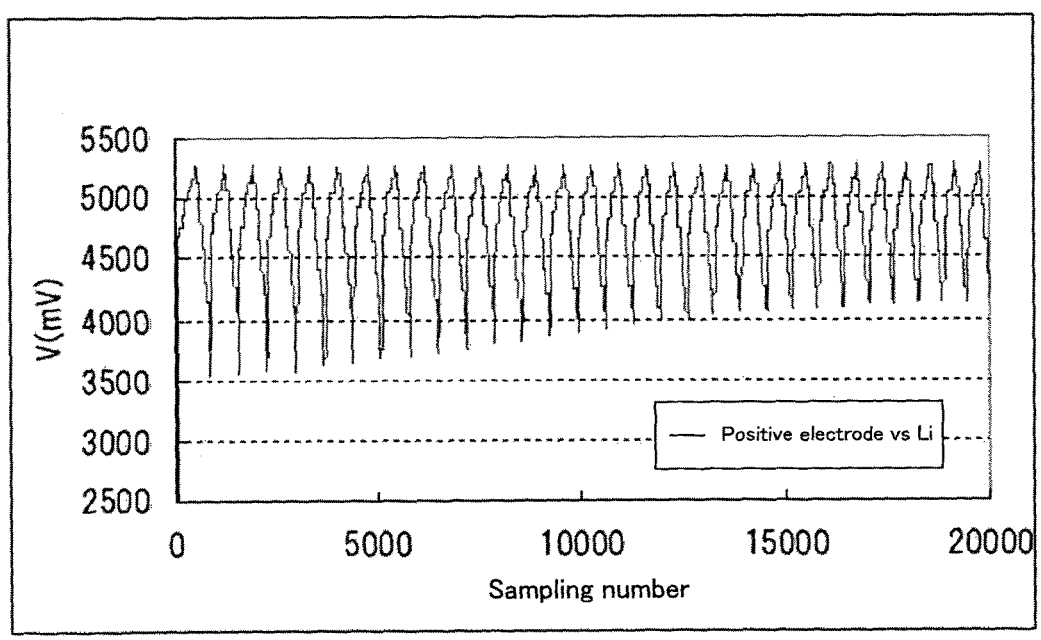
FIG. 10 is a graph depicting, in the longitudinal axis, the voltage between the positive electrode and the reference electrode Li along the charging-discharging cycles in Comparative Example 2, and the sampling number in the horizontal axis.

Moreover, FIG. 10 depicts the data where the voltage between the positive electrode and the reference electrode Li along the charging-discharging cycles using the 3-electrode cell is presented in the longitudinal axis—and the sampling number (equivalent to time) is presented in the horizontal axis.

It was found the results of FIG. 10 that the charging starting and ending point of the potential of the positive electrode was elevated as the number of the charging-discharging cycle increased. Since the charging-discharging cycle was regularly repeated in the range of 3.0 V to 5.2 V between the positive and negative electrodes of FIG. 9, it was found that the discharging starting and charging point of the negative electrode was increased as the charging-discharging cycle was repeated. Specifically, it was found that it was degraded as the charging-discharging cycle of the negative electrode was repeated. After completing the repetitive charging and discharging, the 3-electrode cell was disassembled and the negative electrode was analyzed. As a result, the presence of lithium fluoride was confirmed.

Example 6

—Potential Change of Positive and Negative Electrodes in 3-Electrode Cell—

As for a 3-electrode cell having a positive electrode (the positive electrode of Example 1), a negative electrode (the negative electrode of Example 1), a nonaqueous electrolyte (a nonaqueous solvent in which 1 mol/L of LiPF$_6$ had been dissolved (EC:DMC=3:7 (mass ratio))), and a separator (the separator of Example 1), a commercial product (simple cell with RE for LIB test) manufactured by Takumi Giken was used.

Note that, as the compound having a site capable of bonding to an anion containing a halogen atom, tris(pentafluorophenyl)borane (TPFPB, reagent, manufactured by Tokyo Chemical industry Co., Ltd.) was added in an amount of 1% by mass. As for a reference electrode, Li metal was used.

Figure 11:
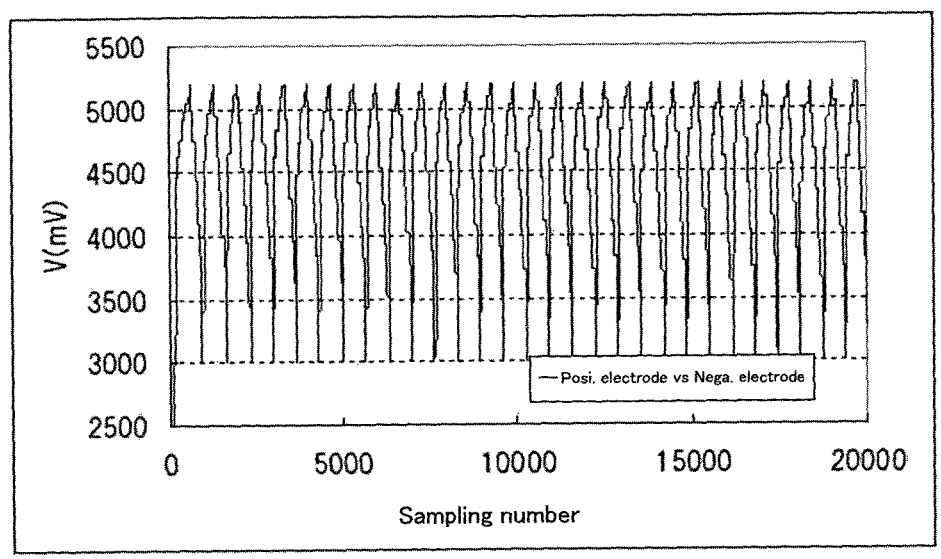
FIG. 11 is a graph depicting, in the longitudinal axis, the voltage between the positive electrode terminal and the negative electrode terminal along the charging-discharging cycles in Example 6, and the sampling number in the horizontal axis.

FIG. 11 depicts the data where the voltage between the positive electrode terminal and the negative electrode terminal along the charging-discharging cycles using the 3-electrode cell is presented in the longitudinal axis, and the sampling number (equivalent to time) is presented in the horizontal axis.

Figure 12:
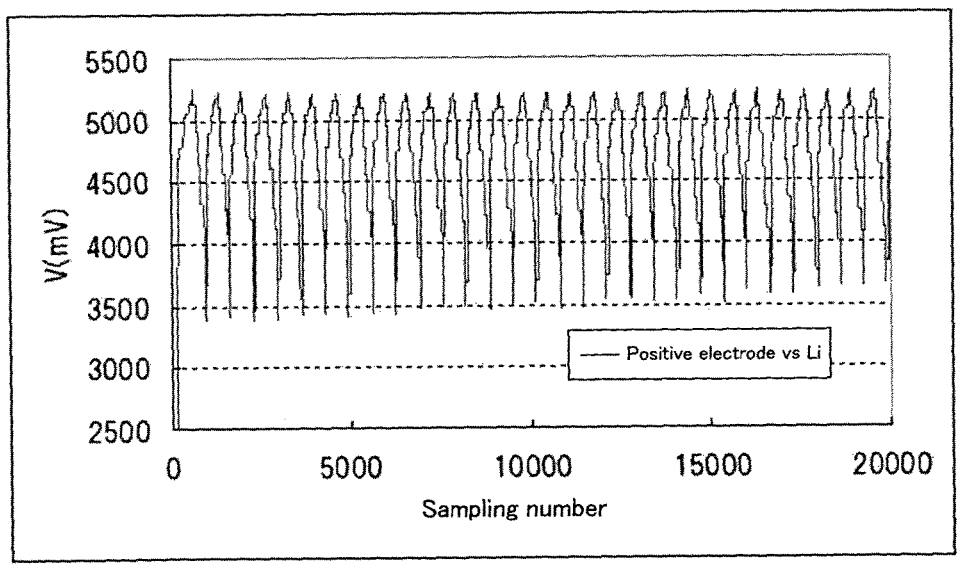
FIG. 12 is a graph depicting, in the longitudinal axis, the voltage between the positive electrode and the reference electrode Li along the charging-discharging cycles in Example 6, and the sampling number in the horizontal axis.

Moreover, FIG. 12 depicts the data where the voltage between the positive electrode and the reference electrode Li along the charging-discharging cycles using the 3-electrode cell is presented in the longitudinal axis, and the sampling number (equivalent to time) is presented in the horizontal axis.

It was found from the results of FIG. 12 that the charging starting and ending point of the potential of the positive electrode in the 3-electrode cell containing TPFPB of Example 6 was not elevated even when the charging-discharging cycle was repeated.

Example 7

A nonaqueous electrolyte secondary battery was produced in the same manner as in Example 1, provided that TPFPB was replaced with 1% by mass of tris(hexafluoroisopropyl)borate (THFIPB, reagent, manufactured by Tokyo Chemical industry Co., Ltd).

The obtained nonaqueous electrolyte secondary battery was subjected to an evaluation of repetitive charging-discharging property in the same manner as in Example 1. The result is presented in FIG. 13. It was found from the result presented in FIG. 13 that the nonaqueous electrolyte secondary battery of Example 7 could achieve a stable charging-discharging cycle.

Example 8

—Production of Nonaqueous Electrolyte Secondary Battery—
—Confirmation of Load Characteristics—
<Production of Positive Electrode>

A positive electrode was produced in the same manner as in Example 1, provided that the mass of the carbon powder (graphite) coated on the aluminum (Al) foil having a diameter of 16 mm in the positive electrode was changed to 20 mg.

<Production of Negative Electrode>

As for a negative electrode, Li (manufactured by Honjo Metal Co., Ltd., thickness: 200 μm) was used.

<Nonaqueous Electrolyte>

As for a nonaqueous electrolyte, 0.3 mL of dimethyl carbonate (DMC), in which 2 mol/L of $LiPF_6$ had been dissolved, was prepared.

Into the dimethyl carbonate (DMC), in which 2 mol/L of $LiPF_6$ had been dissolved, tris(pentafluorophenyl)borane (TPFPB, reagent, manufactured by Tokyo Chemical industry Co., Ltd.) was dissolved as a compound having a site capable of bonding to an anion containing a halogen atom, to give a concentration of 1.0% by mass.

<Separator>

As for a separator, a laboratory filter paper (GA-100 GLASS FIBER FILTER, manufactured by ADVANTEC GROUP) was prepared.

<Production of Battery>

In an argon dry box, the positive electrode, 2 pieces of the separator, the negative electrode, and the nonaqueous electrolyte were placed in a tin (2032-type, manufactured by Hohsen Corp.) for producing a coin-type battery element, to thereby produce a nonaqueous electrolyte secondary battery.

Figure 14:
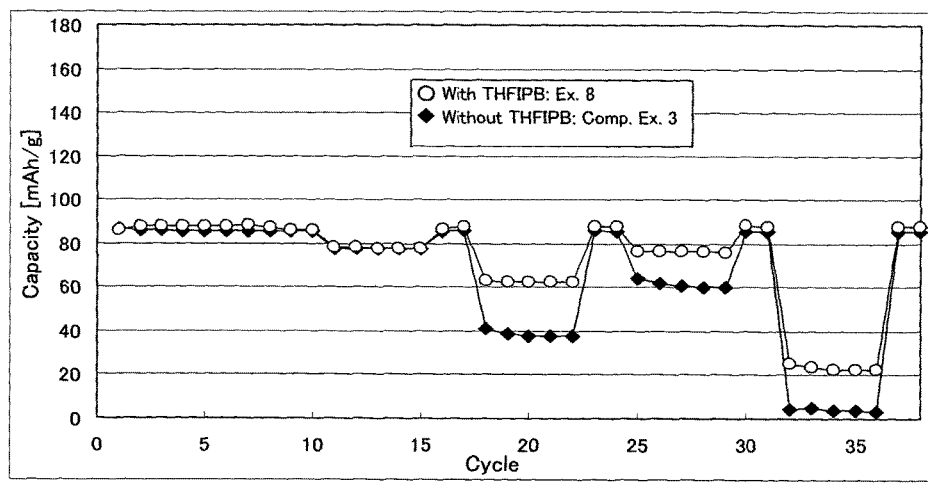
FIG. 14 is a graph illustrating load characteristics of Example 8 and Comparative Example 3.

Next, the produced nonaqueous electrolyte secondary battery of Example 8 was subjected to an evaluation of load characteristics in the following manner. The results of the load characteristics are presented in FIG. 14 (marked with white circle). Note that, the battery capacity was a mass conversion value per the positive electrode active material.

<Evaluation of Load Characteristics>

The following charging-discharging test was performed by means of TOSCAT3001, manufactured by TOYO SYSTEM CO., LTD.

The produced nonaqueous electrolyte secondary battery was left to stand at room temperature (25° C.), and was evaluated sequentially from (1).

(1) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated 10 times.

(2) 5 times discharging: The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 5 $mA/cm^2$. This cycle of charging and discharging was repeated 5 times. The discharge amount in the $3^{rd}$ cycle of (2) was 90.1% of the charged amount in the $10^{th}$ cycle of (1).

(3) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated twice.

(4) 5 times charging: The nonaqueous electrolyte secondary battery was charged to a charge termination voltage of 5.2 V at a constant current of 5 $mA/cm^2$. Next, the nonaqueous electrolyte secondary battery was discharged to 3.0 V at a constant current of 1 $mA/cm^2$. This cycle of charging and discharging was repeated 5 times. The discharge amount in the 3rd cycle of (4) was 71.1% of the discharged amount in the $2^{nd}$ cycle of (3).

(5) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated twice.

(6) 10 times discharging: The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 10 $mA/cm^2$. This cycle of charging and discharging was repeated 5 times. The discharge amount in the $3^{rd}$ cycle of (6) was 87.1% of the discharge amount in the $10^{th}$ cycle of (5).

(7) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated twice.

(8) 10 times charging: The nonaqueous electrolyte secondary battery was charged to a charge termination voltage of 5.2 V at a constant current of 10 $mA/cm^2$. Next, the nonaqueous electrolyte secondary battery was discharged to 3.0 V at a constant current of 1 $mA/cm^2$. This cycle of charging and discharging was repeated 5 times. The discharge amount in the 3rd cycle of (8) was 25.3% of the discharge amount in the $2^{nd}$ cycle of (7).

Comparative Example 3

A nonaqueous electrolyte secondary battery was produced in the same manner as in Example 8, provided that THFIPB was not added. The load characteristics thereof were evaluated in the same manner as in Example 8 as described below. The result (marked with a black lozenge) of the load characteristics of Comparative Example 3 is presented in FIG. 14 together with the result of Example 8. It was found from the results of FIG. 14 that the load characteristics were improved by the addition of THPIPB.

<Evaluation of Load Characteristics>

The following charging-discharging test was performed by means of TOSCAT3001, manufactured by TOYO SYSTEM CO., LTD.

The produced nonaqueous electrolyte secondary battery was left to stand at room temperature (25° C.), and was evaluated sequentially from (1).

(1) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated 10 times.

(2) 5 times discharging: The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 5 $mA/cm^2$. This cycle of charging and discharging was repeated 5 times. The discharge amount in the 3rd cycle of (2) was 90.9% of the charged amount in the $10^{th}$ cycle of (1).

(3) The nonaqueous electrolyte secondary battery was charged to a charge termination voltage of 5.2 V at a constant current of 1 $mA/cm^2$. Next, the nonaqueous electrolyte secondary battery was discharged to 3.0 V at a constant current of 1 $mA/cm^2$. This cycle of charging and discharging was repeated twice.

(4) 5 times charging: The nonaqueous electrolyte secondary battery was charged to a charge termination voltage of 5.2 V at a constant current of 5 mA/cm². Next, the nonaqueous electrolyte secondary battery was discharged to 3.0 V at a constant current of 1 mA/cm². This cycle of charging and discharging was repeated 5 times. The discharge amount in the 3rd cycle of (4) was 43.9% of the discharged amount in the $2^{nd}$ cycle of (3).

(5) The nonaqueous electrolyte secondary battery was charged to a charge termination voltage of 5.2 V at a constant current of 1 mA/cm². Next, the nonaqueous electrolyte secondary battery was discharged to 3.0 V at a constant current of 1 mA/cm². This cycle of charging and discharging was repeated twice.

(6) 10 times discharging: The nonaqueous electrolyte secondary battery was charged to a charge termination voltage of 5.2 V at a constant current of 1 mA/cm². Next, the nonaqueous electrolyte secondary battery was discharged to 3.0 V at a constant current of 10 mA/cm². This cycle of charging and discharging was repeated 5 times. The discharge amount in the $3^{rd}$ cycle of (6) was 70.9% of the discharge amount in the $10^{th}$ cycle of (5).

(7) The nonaqueous electrolyte secondary battery was charged to a charge termination voltage of 5.2 V at a constant current of 1 mA/cm². Next, the nonaqueous electrolyte secondary battery was discharged to 3.0 V at a constant current of 1 mA/cm². This cycle of charging and discharging was repeated twice.

(8) 10 times charging: The nonaqueous electrolyte secondary battery was charged to a charge termination voltage of 5.2 V at a constant current of 10 mA/cm². Next, the nonaqueous electrolyte secondary battery was discharged to 3.0 V at a constant current of 1 mA/cm². This cycle of charging and discharging was repeated 5 times. The discharge amount in the 3rd cycle of (8) was 4.35% of the discharge amount in the 2nd cycle of (7).

Comparative Example 4

<Confirmation of Oxidation Resistance>

A nonaqueous electrolyte secondary battery was produced in the same manner as in Example 1, provided that as a compound having a site capable of bonding to an anion that does not contain a halogen atom, triphenyl borate was used in an amount of 1% by mass. The produced nonaqueous electrolyte secondary battery was evaluated in the same manner as in Example 1.

Figure 13:
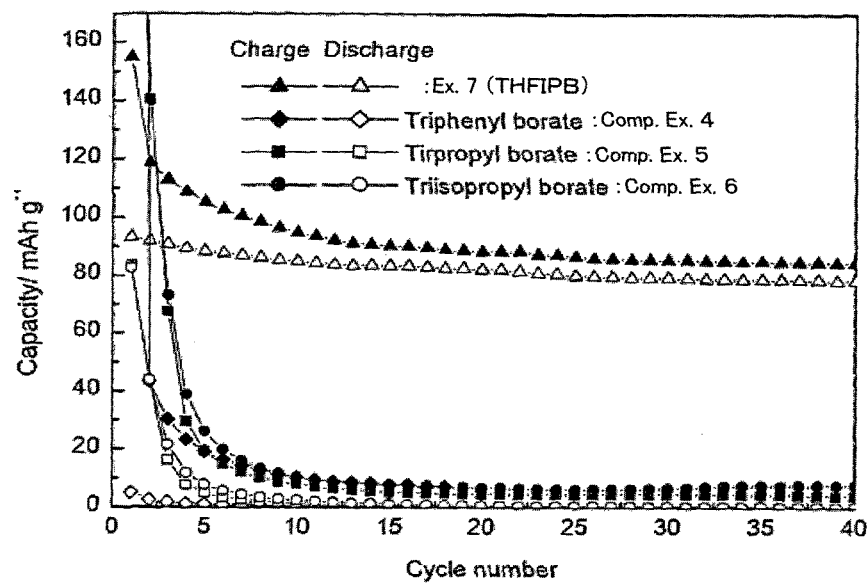
FIG. 13 is a graph illustrating relationships between the charging-discharging cycles and the battery capacities in Example 7 and Comparative Examples 4 to 6.
Figure 15:
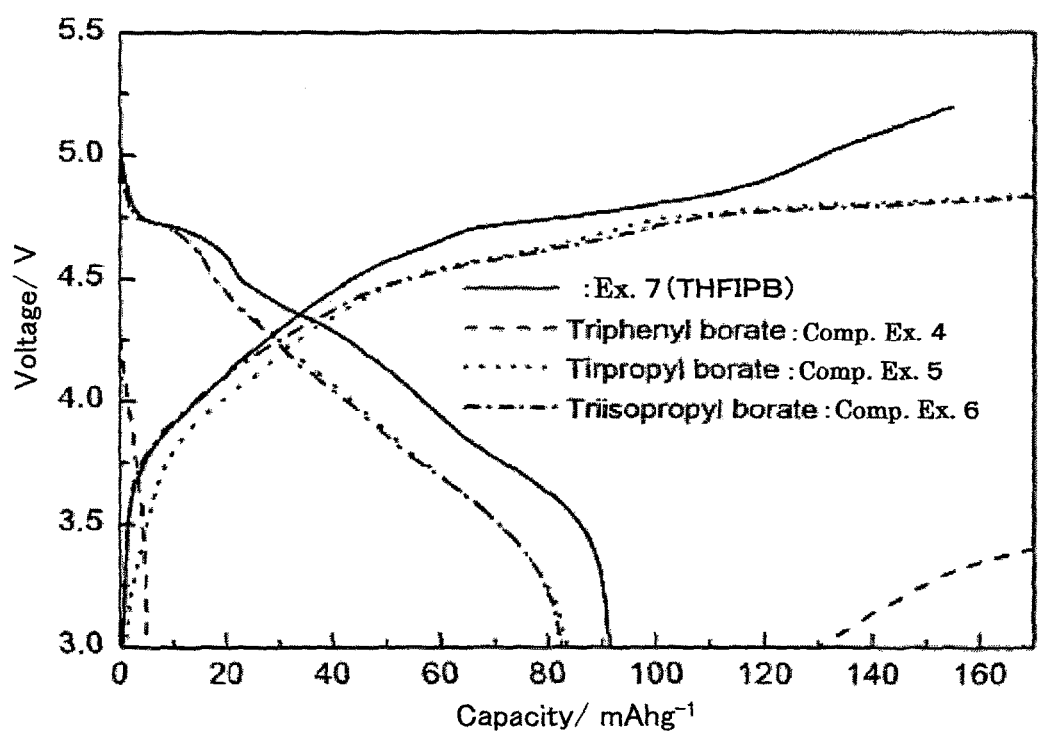
FIG. 15 is a graph depicting charge-discharge curves in Example 7 and Comparative Examples 4 to 6.

The repetitive charging-discharging property thereof is presented in FIG. 13. It was found from the result of FIG. 13 that Comparative Example 4 was rapidly deteriorated. FIG. 15 depicts the initial charge-discharge curve of Comparative Example 4 together with that of Example 7. It was found from the results of FIG. 15 that the charging voltage of Comparative Example 4 did not reach 5.2 V. This result indicated that triphenyl borate predominantly reacted at low voltage of about 4.0 V or lower, so that the positive electrode could not be sufficiently charged.

Comparative Example 5

<Confirmation of Oxidation Resistance>

A nonaqueous electrolyte secondary battery was produced in the same manner as in Example 1, provided that as a compound having a site capable of bonding to an anion that does not contain a halogen atom, tripropyl borate was used in an amount of 1% by mass. The produced nonaqueous electrolyte secondary battery was evaluated in the same manner as in Example 1.

The repetitive charging-discharging property thereof is presented in FIG. 13. It was found from the result of FIG. 13 that Comparative Example 5 was rapidly deteriorated. FIG. 15 depicts the initial charge-discharge curve of Comparative Example 5 together with that of Example 7. It was found from the results of FIG. 15 that the charging voltage of Comparative Example 5 did not reach 5.2 V. This result indicated that tripropyl borate predominantly reacted at low voltage of about 4.7V to about 4.8V, so that the positive electrode could not be sufficiently charged.

Comparative Example 6

<Confirmation of Oxidation Resistance>

A nonaqueous electrolyte secondary battery was produced in the same manner as in Example 1, provided that as a compound having a site capable of bonding to an anion that does not contain a halogen atom, triisopropylborate was used in an amount of 1% by mass. The produced nonaqueous electrolyte secondary battery was evaluated in the same manner as in Example 1.

The repetitive charging-discharging property thereof is presented in FIG. 13. It was found from the result of FIG. 13 that Comparative Example 6 was rapidly deteriorated. FIG. 15 depicts the initial charge-discharge curve of Comparative Example 6 together with that of Example 7. It was found from the results of FIG. 15 that the charging voltage of Comparative Example 6 did not reach 5.2 V. This result indicated that triisopropyl borate predominantly reacted at low voltage of about 4.7V to about 4.8V, so that the positive electrode could not be sufficiently charged.

The embodiments of the present invention are, for example, as follows:

<1> A nonaqueous electrolytic capacitor element, containing:
a positive electrode containing a positive electrode active material capable of intercalating or deintercalating anions,
a negative electrode containing a negative electrode active material, and
a nonaqueous electrolyte, which contains a nonaqueous solvent, an electrolyte salt containing a halogen atom, and a compound having a site capable of bonding to an anion containing a halogen atom.

<2> The nonaqueous electrolytic capacitor element according to <1>, wherein the compound having a site capable of bonding to an anion containing a halogen atom is a compound having a site capable of chemically bonding to an anion containing a fluorine atom.

<3> The nonaqueous electrolytic capacitor element according to any of <1> or <2>, wherein the site capable of bonding to an anion containing a halogen atom is a boron atom in a molecule of the compound.

<4> The nonaqueous electrolytic capacitor element according to any one of <1> to <3>, wherein the compound having a site capable of bonding to an anion containing a halogen atom is at least one selected from the group consisting of a compound represented by the following general formula (1), and a compound represented by the following general formula (2):

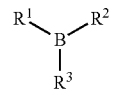

General Formula (1)

where $R^1$, $R^2$ and $R^3$ may be the same or different, and each denote an alkyl group, an aryl group, or a heteroaryl group, each of which may be substituted with a halogen atom, an alkyl group, an alkoxide group, a thiol group, a thioalkoxide group, an aryl group, an ether group, or a thioether group,

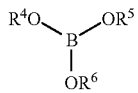

General Formula (2)

where $R^4$, $R^5$ and $R^6$ may be the same or different, and each denote an alkyl group, an aryl group, or a heteroaryl group, each of which may be substituted with a halogen atom, an alkyl group, an alkoxide group, a thiol group, a thioalkoxide group, an aryl group, an ether group, or a thioether group.

<5> The nonaqueous electrolytic capacitor element according to any one of <1> to <4>, wherein the compound having a site capable of bonding to an anion containing a halogen atom is tris(pentafluorophenyl)borane (TPFPB), or, tris(hexafluoroisopropyl)borate (THFIPB), or both thereof.

<6> The nonaqueous electrolytic capacitor element according to any one of <1> to <5>, wherein an amount of the compound having a site capable of bonding to an anion containing a halogen atom is 0.5% by mass or greater relative to the nonaqueous electrolyte.

<7> The nonaqueous electrolytic capacitor element according to any one of <1> to <6>, wherein a maximum voltage of the nonaqueous electrolytic capacitor element at the time of charging and discharging is 4.5 V to 6.0 V.

<8> The nonaqueous electrolytic capacitor element according to any one of <1> to <7>, wherein the negative electrode active material is a carbonaceous material capable of storing or releasing metallic lithium, or lithium ion, or both thereof.

<9> The nonaqueous electrolytic capacitor element according to any one of <1> to <8>, wherein the electrolyte salt containing a halogen atom is $LiPF_6$.

<10> The nonaqueous electrolytic capacitor element according to any one of <1> to <9>, wherein the nonaqueous solvent in the nonaqueous electrolyte contains dimethyl carbonate, and wherein an amount of the dimethyl carbonate is 70% by mass or greater relative to the nonaqueous solvent.

REFERENCE SIGNS LIST 1 positive electrode
2 negative electrode
3 separator
4 outer tin
5 negative electrode lead wire
6 positive electrode lead wire
10 nonaqueous electrolytic capacitor element

The invention claimed is:

1. A nonaqueous electrolytic capacitor element, comprising:
a positive electrode comprising a positive electrode active material capable of intercalating or deintercalating anions,
a negative electrode comprising carbon powder as a negative electrode active material, wherein the carbon powder of the negative electrode active material has a BET specific surface area by nitrogen adsorption of 4,600 m²/g, and
a nonaqueous electrolyte, which comprises a nonaqueous solvent, an electrolyte salt consisting of $LiPF_6$, and a compound comprising a site capable of bonding to a halogen-containing anion, wherein the compound comprising a site capable of bonding to a halogen-containing anion is at least one member selected from the group consisting of a compound represented by formula (1), and a compound represented by formula (2):

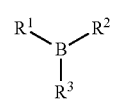

Formula (1)

where $R^1$, $R^2$ and $R^3$ are independently an alkyl group, an aryl group, or a heteroaryl group, each of which is optionally substituted with a halogen atom, an alkyl group, an alkoxide group, a thiol group, a thioalkoxide group, an aryl group, an ether group, or a thioether group,

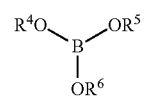

Formula (2)

where $R^4$, $R^5$ and $R^6$ are independently an alkyl group, an aryl group, or a heteroaryl group, each of which is optionally substituted with a halogen atom, an alkyl group, an alkoxide group, a thiol group, a thioalkoxide group, an aryl group, an ether group, or a thioether group; and wherein an amount of the compound comprising a site capable of bonding to an a halogen containing anion comprising a halogen atom is 0.5% by mass or greater and 5% by mass or less relative to an amount of the nonaqueous electrolyte;
wherein the electrolyte salt is present in an amount higher than 2 mol/L, and wherein the capacitor element has a maximum voltage during charging that is higher than 4.5 V.

2. The nonaqueous electrolytic capacitor element according to claim 1, wherein the compound comprising a site capable of bonding to a halogen-containing anion is at least one of tris(pentafluorophenyl)borane and tris(hexafluoroisopropyl)borate.

3. The nonaqueous electrolytic capacitor element according to claim 1, wherein a maximum voltage of the nonaqueous electrolytic capacitor element during charging and discharging is 4.5 V to 6.0 V.

4. The nonaqueous electrolytic capacitor element according to claim 1, wherein the negative electrode active material is a carbon powder capable of storing or releasing at least one of metallic lithium and lithium ion.

5. The nonaqueous electrolytic capacitor element according to claim 1, wherein
the nonaqueous solvent in the nonaqueous electrolyte comprises dimethyl carbonate, and
an amount of dimethyl carbonate is 70% by mass or greater relative to an amount of the nonaqueous solvent.

* * * * *